United States Patent [19]

Sieffert

[11] Patent Number: 5,630,101
[45] Date of Patent: May 13, 1997

[54] SYSTEM FOR COMMUNICATION OF IMAGE INFORMATION BETWEEN MULTIPLE-PROTOCOL IMAGING DEVICES

[75] Inventor: Kent J. Sieffert, Minneapolis, Minn.

[73] Assignee: Minnesota Mining and Manufacturing Company, St. Paul, Minn.

[21] Appl. No.: 343,184

[22] Filed: Nov. 22, 1994

[51] Int. Cl.$^6$ ............................................. G06F 15/00
[52] U.S. Cl. ............... 395/500; 364/240.7; 364/238.2; 364/239; 364/239.3; 364/274.1; 364/284.2; 364/DIG. 2
[58] Field of Search ................................ 395/118, 125, 395/500

[56] References Cited

U.S. PATENT DOCUMENTS

| | | | |
|---|---|---|---|
| 4,604,686 | 8/1986 | Reiter et al. | 395/500 |
| 5,060,140 | 10/1991 | Brown et al. | |
| 5,200,993 | 4/1993 | Wheeler et al. | 379/96 |
| 5,303,342 | 4/1994 | Edge | 395/164 |
| 5,329,431 | 7/1994 | Taylor et al. | 362/85 |
| 5,339,413 | 8/1994 | Koval et al. | 395/650 |
| 5,392,393 | 2/1995 | Deering | 395/162 |
| 5,410,675 | 4/1995 | Shreve et al. | 395/500 |
| 5,432,906 | 7/1995 | Newman et al. | 395/162 |
| 5,457,784 | 10/1995 | Wells et al. | 395/829 |
| 5,493,635 | 2/1996 | Brindle et al. | 395/114 |

*Primary Examiner*—Kevin J. Teska
*Assistant Examiner*—Ayni Mohamed
*Attorney, Agent, or Firm*—Carolyn A. Bates; Steven J. Shumaker

[57] ABSTRACT

A medical imaging system for communicating image information between a plurality of different input imaging devices having different input protocols and a plurality of different output imaging devices having different output protocols takes advantage of a reusable software architecture having a plurality of functionally independent components. The individual components can be configured in a communication pipeline to communicate image information between an input imaging device and an output imaging device according to desired protocols. Each component can be interchanged with a differently configured component to facilitate communication of image information according to a different protocol, thereby reconfiguring the pipeline to achieve significant flexibility. Moreover, the software architecture is scalable to produce a plurality of communication pipelines, each of which can be configured according to desired protocols. Thus, the system of the present invention can support a different protocol by either swapping components to reconfigure a single communication pipeline, or by simply selecting an alternative among a plurality of differently configured communication pipelines in the scalable architecture. Because each of the components is isolated and functionally independent, if redesign of a component is necessary, several programmers can be allocated to the effort with little added overhead, saving time and expense. The modularity of the architecture also enables necessary modifications or corrections to be made to a single component with little impact to the overall system.

32 Claims, 3 Drawing Sheets

SYSTEM FOR COMMUNICATION OF IMAGE INFORMATION BETWEEN MULTIPLE-PROTOCOL IMAGING DEVICES

FIELD OF THE INVENTION

The present invention relates to imaging systems, and, more particularly, to systems for communicating image information between an input imaging device and an output imaging device in an imaging system.

DISCUSSION OF RELATED ART

An imaging system typically includes an input imaging device that generates image information, and an output imaging device that forms a visible representation of an image based on the image information. In a medical imaging system, for example, the input imaging device may include a diagnostic device, such as a magnetic resonance (MR), computed tomography (CT), conventional radiography (X-ray), or ultrasound device. Alternatively, the input imaging device may include a user interface device, such as a keypad, mouse, or trackball, also capable of generating medical image information. The output imaging device in a medical imaging system typically includes a continuous tone digital laser imager. The laser imager exposes an imaging media in response to the image information to form the visible representation.

The image information generated by the input imaging device includes image data containing digital image values representative of the image, and imaging requests specifying operations to be performed by the laser imager. Each of the digital image values corresponds to one of a plurality of pixels in the original image, and represents an optical density associated with the respective pixel. In response to an imaging request, the laser imager converts the digital image values to generate laser drive values used to modulate the intensity of a scanning laser. The laser drive values are calculated to produce exposure levels, on the imaging media, necessary to reproduce the optical densities associated with the pixels in the original image when the media is developed, either by wet chemical processing or dry thermal processing. The laser imager may perform a number of additional operations in response to the imaging requests generated by the input imaging. For example, the laser imager may manipulate the image data, prior to generating the laser drive values, to produce a variety of different format and/or appearance characteristics.

The image information processed by the laser imager has a format determined by an input protocol associated with the particular input imaging device. Medical imaging systems preferably are capable of handling image information generated according to a variety of diverse input protocols. An input protocol can be characterized as including an input driver protocol, which determines requirements for communication with a particular input imaging device, and an input interpreter protocol, which determines the format for interpreting image information generated by the input imaging device. The number of different input protocols results, to some degree, from the various types of input imaging devices presently in use, e.g., MR, CT, X-ray, ultrasound, each of which may generate image information according to a different protocol. The primary source of different input protocols is, however, the existence of a number of modalities, i.e., input imaging devices made by different manufacturers and having unique, manufacturer-specific input protocols. For example, manufacturers such as Siemens, Toshiba, GE, and Picker presently make CT-type input imaging devices that provide similar functionality, but which generate image information according to different modality-specific input protocols.

In addition to the ability to handle multiple input protocols, medical imaging systems preferably are capable of handling communication of image information to output imaging devices according to multiple output protocols. Like an input protocol, an output protocol can be characterized as including an output driver protocol, which determines requirements for communication with a particular output imaging device, and an output interpreter protocol, which determines the format for translating image information into a form understood by the output imaging device. Different output protocols primarily result from the availability of laser imaging output devices having different sets of functional capabilities. The different sets of functional capabilities present varying complexity that can lead to different output protocols. For example, Minnesota Mining & Manufacturing Company ("3M"), of St. Paul, Minn., presently offers laser imagers having different sets of functional capabilities referred to as the "831," "952," and "SuperSet" sets, each of which is associated with a set-specific output protocol.

Existing medical imaging systems presently accommodate multiple input and output protocols on an ad-hoc basis by the design of a hardware and/or software interface specifically configured for a particular input protocol and a particular output protocol. The use of a custom-made interface is extremely inflexible. If communication with a different input imaging device is later required, the entire interface must be redesigned to handle the relationship between the new input protocol and the old output protocol. A change in the output imaging device similarly requires redesign of the interface to handle the relationship between the new output protocol and the old input protocol. Unfortunately, redesign of the interface is a cumbersome task that often requires a significant investment in hardware and/or software development time. Even seemingly minor modifications in functionality of an input or output imaging device can produce numerous, costly design changes that propagate throughout the interface.

Nevertheless, there are increasing demands for more flexible medical imaging systems capable of providing communication between a variety of input and output imaging devices having multiple protocols. It is desirable that such medical imaging systems not only provide flexibility with respect to current protocols, but also be capable of adaptation to handle future protocols in a cost-effective manner. Existing medical imaging systems generally fail to meet the above demands.

SUMMARY OF THE INVENTION

In view of the limitations of existing medical imaging systems, the present invention is directed to a medical imaging system for communicating image information between a plurality of different input imaging devices having different input protocols and a plurality of different output imaging devices having different output protocols.

The system of the present invention takes advantage of a reusable software architecture having a plurality of functionally independent components. The individual components can be configured in a communication pipeline to communicate image information between an input imaging device and an output imaging device according to desired protocols. Each component can be interchanged with a differently configured component to facilitate communication of image information according to a different protocol, thereby reconfiguring the pipeline to achieve significant flexibility. As a further advantage, the communication pipeline can be dynamically configured "on the fly" to incorporate components appropriate for the current environment.

Moreover, the software architecture is scalable to produce a plurality of communication pipelines, each of which can be configured according to desired protocols. Thus, the system of the present invention can support a different protocol by either swapping components to reconfigure a single communication pipeline, or by simply selecting an alternative among a plurality of differently configured communication pipelines in the scalable architecture.

Further, because each of the components is isolated and functionally independent, if redesign of a component is necessary, several programmers can be allocated to the effort with little added overhead, saving time and expense. The modularity of the architecture also enables necessary modifications or corrections to be made to a single component with little impact to the overall system.

Additional features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

To achieve the foregoing advantages, as broadly embodied and described herein, the present invention provides, in a first embodiment, a software system for communicating image information between at least one of a plurality of different input imaging devices and at least one of a plurality of different output imaging devices, the software system comprising one or more input driver components, each of the input driver components being configured to receive image information from one of the input imaging devices, the image information being received according to one of a plurality of different input driver protocols, wherein each of the input driver protocols is specifically associated with one of the input imaging devices, one or more input interpreter components, each of the input interpreter components being configured to generate first imaging requests based on the image information received by one of the input driver components, the first imaging requests being generated according to one of a plurality of different input interpreter protocols, wherein each of the input interpreter protocols is specifically associated with one of the input imaging devices, one or more output interpreter components, each of the output interpreter components being configured to generate second imaging requests based on the first imaging requests generated by one of the input interpreter components, the second imaging requests being generated according to one of a plurality of different output interpreter protocols, wherein each of the output interpreter protocols is specifically associated with one of the output imaging devices, one or more output driver components, each of the output driver components being configured to communicate the second imaging requests generated by one of the output interpreter components to one of the output imaging devices, the second imaging requests being communicated according to one of a plurality of different output driver protocols, wherein each of the output driver protocols is specifically associated with one of the output imaging devices, and an interface executive component for defining one or more communication pipelines, each of the pipelines communicatively interconnecting one of the input imaging devices, one of the input driver components, one of the input interpreter components, one of the output interpreter components, one of the output driver components, and one of the output imaging devices.

In a second embodiment, the present invention provides an imaging system having a software system for communicating image information between at least one of a plurality of different input imaging devices and at least one of a plurality of different output imaging devices, the imaging system comprising one or more input driver components, each of the input driver components being configured to receive image information from one of the input imaging devices, the image information being received according to one of a plurality of different input driver protocols, wherein each of the input driver protocols is specifically associated with one of the input imaging devices, one or more input interpreter components, each of the input interpreter components being configured to generate first imaging requests based on the image information received by one of the input driver components, the first imaging requests being generated according to one of a plurality of different input interpreter protocols, wherein each of the input interpreter protocols is specifically associated with one of the input imaging devices, one or more output interpreter components, each of the output interpreter components being configured to generate second imaging requests based on the first imaging requests generated by one of the input interpreter components, the second imaging requests being generated according to one of a plurality of different output interpreter protocols, wherein each of the output interpreter protocols is specifically associated with one of the output imaging devices, one or more output driver components, each of the output driver components being configured to communicate the second imaging requests generated by one of the output interpreter components to one of the output imaging devices, the second imaging requests being communicated according to one of a plurality of different output driver protocols, wherein each of the output driver protocols is specifically associated with one of the output imaging devices, and an interface executive component for defining one or more communication pipelines, each of the pipelines communicatively interconnecting one of the input imaging devices, one of the input driver components, one of the input interpreter components, one of the output interpreter components, one of the output driver components, and one of the output imaging devices.

In a third embodiment, the present invention provides a software system for communicating image information between at least one of a plurality of different input imaging devices and at least one of a plurality of different output imaging devices, the software system comprising one or more input interface components, each of the input interface components being configured to receive image information from one of the input imaging devices, the image information being received according to one of a plurality of different input interface protocols, wherein each of the input interface protocols is specifically associated with one of the input imaging devices, and to generate first imaging requests based on the received image information, the first imaging requests being generated according to the one of the input interface protocols, one or more output interface components, each of the output interface components being configured to generate second imaging requests based on the first imaging requests generated by one of the input interface components, the second imaging requests being generated according to one of a plurality of different output interface protocols, wherein each of the output interface protocols is specifically associated with one of the output imaging devices, and to communicate the second imaging requests generated by one of the output interface components to one of the output imaging devices, the second imaging requests being communicated according to the one of the output interface protocols, and an interface executive component for defining one or more communication pipelines, each of the pipelines communicatively interconnecting one of the input imaging devices, one of the input interface components, one of the output interface components, and one of the output imaging devices.

In a fourth embodiment, the present invention provides an imaging system having a software system for communicating image information between at least one of a plurality of different input imaging devices and at least one of a plurality of different output imaging devices, the software system comprising one or more input interface components, each of the input interface components being configured to receive image information from one of the input imaging devices, the image information being received according to one of a plurality of different input interface protocols, wherein each of the input interface protocols is specifically associated with one of the input imaging devices, and to generate first imaging requests based on the received image information, the first imaging requests being generated according to the one of the different input interface protocols, one or more output interface components, each of the output interface components being configured to generate second imaging requests based on the first imaging requests generated by one of the input interface components, the second imaging requests being generated according to one of a plurality of different output interface protocols, wherein each of the output interface protocols is specifically associated with one of the output imaging devices, and to communicate the second imaging requests generated by one of the output interface components to one of the output imaging devices, the second imaging requests being communicated according to the one of the output interface protocols, and an interface executive component for defining one or more communication pipelines, each of the pipelines communicatively interconnecting one of the input imaging devices, one of the input interface components, one of the output interface components, and one of the output imaging devices.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
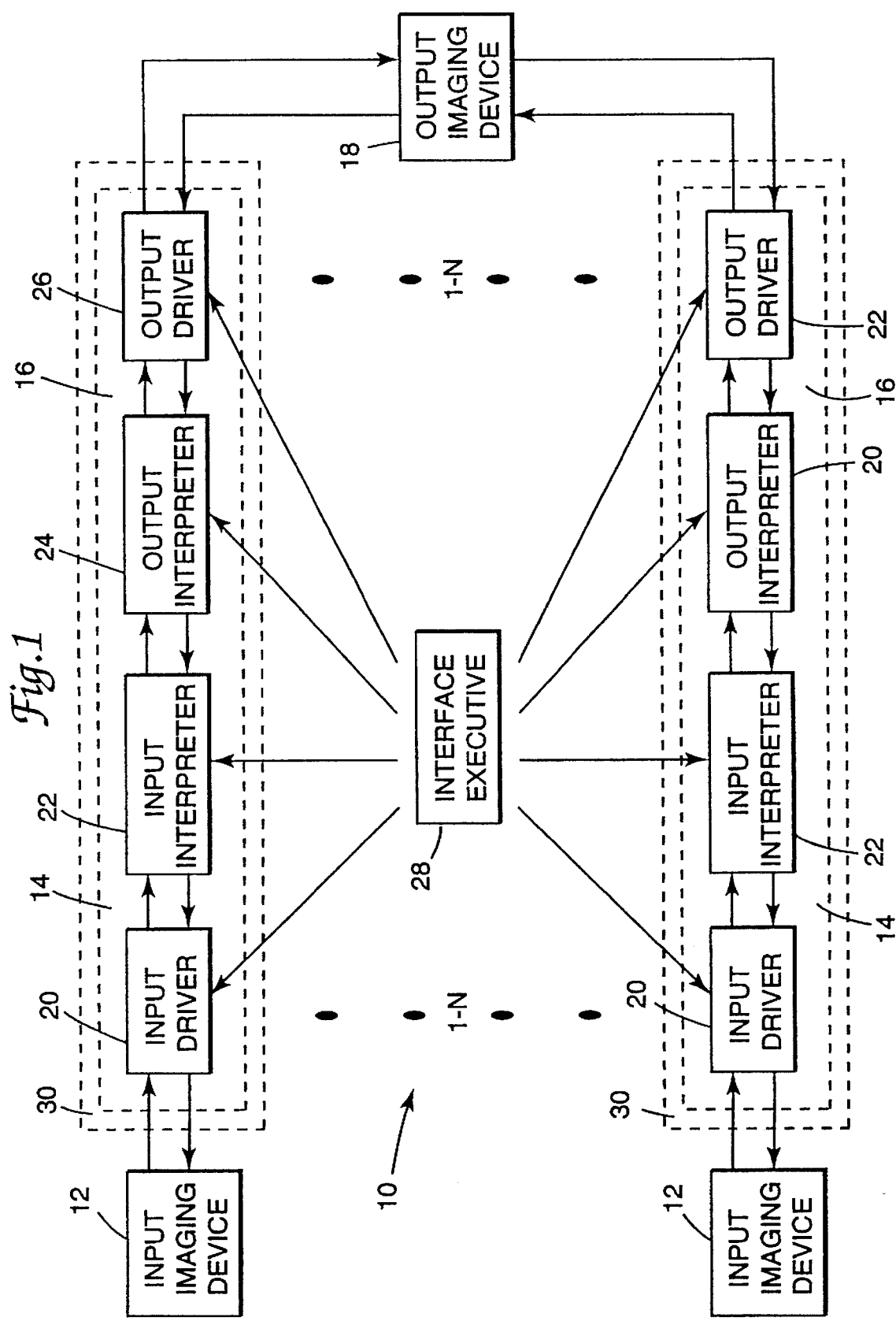
FIG. 1 is a functional block diagram of a medical imaging system for communication of image information between multiple-protocol imaging devices, in accordance with the present invention.

FIG. 1 is a functional block diagram of a medical imaging system 10 for communication of image information between multiple-protocol imaging devices, in accordance with the present invention. The medical imaging system 10 includes a plurality of input imaging devices 12, one or more input interface components 14, one or more output interface components 16, and one or more output imaging devices 18. Each of the input interface components 14 includes an input driver component 20 and an input interpreter component 22. Each of the output interface components 16 includes an output interpreter component 24 and an output driver component 26. An interface executive component 28 defines one or more (1 to N) communication pipelines 30. Each communication pipeline 30 communicatively binds one of the input imaging devices 12, one of the input driver components 20, one of the input interpreter components 22, one of the output interpreter components 24, one of the output driver components 26, and output imaging device 18 in a bi-directional manner. The output imaging device 18 may communicate with any of pipelines 30 on a shared basis. Alternatively, a plurality of output imaging devices 18 could be provided, each being communicatively interconnected with a particular pipeline 30.

The input interface components 14, output interface components 16, and interface executive component 28 are implemented as a software system that interfaces with input imaging devices 12 and output imaging device 18. The software system may be implemented as part of an output imaging device 18, such as a continuous tone digital laser imager, or as part of a discrete device controlling communication of image information between input imaging devices 12 and output imaging device 18. An example of a laser imager to which the software system may be readily applied is disclosed in copending U.S. patent application Ser. No. 07/981,075, of Schubert et al., the entire content of which is incorporated herein by reference. The image information generated by input imaging device 12 includes both requests for imaging operations, and image data containing digital image values representative of an image to be handled by output imaging device 18. For purposes of this description, pipeline 30 will be described as handling communication of image information in the form of imaging requests, with image information in the form of digital image values representative of the image being communicated by a separate communication path. It is conceivable, however, that pipeline 30 could be configured to handle communication of image information in the form of both requests for imaging operations and image data containing the digital image values.

Each of input interface components 14 is configured to receive the image information, via one of input driver components 20, from an input imaging device 12 according to one of a plurality of different input interface protocols. Each input interface protocol is specifically associated with one of input imaging devices 12, and reflects the modality-specific requirements for communication with the particular input imaging device. Each of the input interface components 14 also is configured to generate first imaging requests according to one of the input interface protocols, via one of input interpreter components 22, based on the content of the received image information. The first imaging requests represent instructions generated by input imaging device 12, as translated by input interpreter component 22 for communication to output interface component 16.

Each of output interface components 16 is configured to generate second imaging requests according to one of a plurality of different output protocols, via one of output interpreter components 24, based on the content of the first imaging request. The second imaging requests represent the content of the first imaging requests, as translated by output interpreter component 24 for communication to output imaging device 18. Each output interface protocol is specifically associated with the type of output imaging device 18 and, like the input interface protocol, reflects the requirements for communication with the particular output imaging device. In addition, each of the output interface components 16 is configured to communicate the second imaging requests to output imaging device 18, via output driver component 26, according to one of the output interface protocols.

The sub-components of input interface components 14 and output interface components 16, i.e., input driver component 20, input interpreter component 22, output interpreter component 24, and output driver component 26, are described together herein in recognition that an input interface component, as well as an output interface component, could be implemented as a single, integral software module. It is preferred, however, that an input interface component 14 be realized by a discrete input driver component 20 and a discrete input interpreter component 22 and, similarly, that an output interface component 16 be realized by a discrete output interpreter component 24 and a discrete output drive component 26. A discrete implementation of the sub-components divides the functionality of each interface component 14, 16 into smaller packages for better modularity. As an example, with added modularity, changes in hardware interface specifications for an input imaging device 12 require only reconfiguration of input driver component 20, instead of the entire input interface component 14.

Each of the input interface protocols includes both an input driver protocol applicable to input driver components 20 and an input interpreter protocol applicable to input interpreter components 22. The appropriate input driver protocol is determined by the communication requirements of a particular input imaging device 12, whereas the appropriate input interpreter protocol is determined by the image information format of the particular input imaging device. The image information format refers to the types of imaging requests generated according to the protocol of a particular input imaging device 12. The input driver protocol specifies the manner in which an input driver component 20 should carry out the transfer of image information from an input imaging device 12. The input interpreter protocol specifies the manner in which input interpreter component 22 should interpret the image information to generate the first imaging requests. The input driver and input interpreter protocols can vary significantly according to differences in the type of input imaging device 12, e.g., MR, CT, conventional X-ray, ultrasound, as well as the manufacturer of the input imaging device, e.g., Siemens, Toshiba, GE, or Picker.

Each of the output interface protocols includes an output interpreter protocol applicable to output interpreter components 24 and an output driver protocol applicable to output driver components 26. The output driver protocol is determined by the communication requirements of output imaging device 18, whereas the appropriate output interpreter protocol is determined by the image information format of the output imaging device. The output interpreter protocol specifies the manner in which output interpreter component 24 should interpret first imaging requests to generate second imaging requests in a form understood by output imaging device 18. The input driver protocol specifies the manner in which an output driver component 20 should carry out the transfer of second imaging requests to output imaging device 18. Like the input interface protocols, the output interface protocols are subject to variation. For example, both the output driver and output interpreter protocol can vary according to the type of functional capabilities provided by output imaging device 18, e.g., 831, 952, or Superset in the case of a laser imager manufactured by 3M.

Notwithstanding functions specific to a particular protocol, components 20, 22, 24, 26 of like type, e.g., all input driver components, are configured to perform several common tasks. For example, input driver components 20 share a set of common tasks necessary to communicate with a particular input imaging device 12. An input driver component 20 is configured to handle any hardware specifics such as interrupts, buffers, and handshaking necessary to transfer imaging information to and from a particular input imaging device 12. The input driver component 20 is further configured to handle any other specific needs of input imaging device 12, such as packetizing or initialization. The input driver component 20 performs all necessary communication tasks, isolating the remainder of pipeline 30 from any knowledge that communication is carried out via a serial interface, a parallel interface, a network interface, or any other mechanism. In summary, the responsibility of input driver component 20 is two-fold. First, input driver component 20 receives image information from input imaging device 12 and prepares the image information for the next stage of pipeline 30, i.e., input interpreter component 22. Second, input driver component 20 transmits any responses emerging from bi-directional pipeline 30 to input imaging device 12, as will be further explained below.

The input interpreter component 22, the next component in pipeline 30, also shares a common set of tasks with other input interpreter components, without regard to a specific input interpreter protocol. Primarily, after obtaining image information from an input driver component 20, an input interpreter component 22 analyzes requests contained in the image information and translates them to generate first imaging requests corresponding to operations provided by output imaging device 18. The first imaging requests include requests for a variety of common imaging services provided by output imaging device 18. In a typical medical imaging system, such requests may include, for example, requests to initiate an image print job by output imaging device 18, requests to abort a previously initiated image print job, requests to define or modify a format of an image to be printed, requests to delete a set of image data representative of a previously acquired image, and requests to store image data in a particular image location.

The manner in which input interpreter component 22 interprets the requests generated by input imaging device 12 may vary according to the specific input interpreter protocol. The input interpreter component 22 understands the precise format, instructions, and timing constraints inherent in the image information generated by a particular input imaging device 12. Nevertheless, all input interpreter components 22 still provide a common, basic function of generating first imaging requests. The input interpreter component 22 sends the first imaging requests along pipeline 30. Once the first imaging requests have been processed by downstream components in bi-directional pipeline 30, and a response has been received, input interpreter component 20 forms an appropriate response for input imaging device 12. The input interpreter component 22 sends the response along pipeline 30 to input imaging device 12, via input driver component 20, which handles communication requirements necessary to transmit the response to the input imaging device.

The output interpreter component 24 is the third component in pipeline 30. The output imaging device 18 may speak one of many different protocols, such as 831, 952, or Superset in the case of a laser imager manufactured by 3M. An output interpreter component 24 is configured to receive, via pipeline 30, first imaging requests generated by an input interpreter component 22, and to interpret the first imaging requests to generate second imaging requests, which conform to the particular protocol required by output imaging device 18. The second imaging requests correspond to the first imaging requests in substance, but are configured according to the output protocol understood by output imaging device 18.. Thus, the second imaging requests serve as requests for the same imaging services specified by first imagng requests. The manner in which an output interpreter component 24 interprets the instructions may vary according to the specific output interpreter protocol dictated by output imaging device 18, but all output interpreter components 24 share a common task of generating second imaging requests in a protocol understood by the output imaging device. The output interpreter component 24 sends the second imaging requests along pipeline 30. When output imaging device 18 processes the second imaging requests and formulates a response received via pipeline 30, output interpreter component 24 removes any output protocol-specific information and forms an appropriate response for input interpreter component 22.

The output driver component 26 is the fourth component in pipeline 30. Like input driver components 20, all output driver components 26 perform a common set of communication tasks. Specifically, an output driver component 26 is configured to handle any hardware specifics such as interrupts, buffers, and handshaking necessary to transfer imaging information to and from a particular output imaging device 18. The output driver component 26 isolates the remainder of pipeline 30 from any knowledge that communication with output imaging device 18 is carried out via a serial interface, a parallel interface, or a dual-port RAM, etc. The output driver component 26 transmits second imaging requests generated by an output interpreter component 24 to output imaging device 18, maintaining any communication requirements. Further, output driver component 26 receives responses from output imaging device 18, and prepares the response for transmission to output interpreter component 24 via bi-directional pipeline 30.

The interface executive component 28, which defines the structure of pipeline 30, is the fifth component of the software system. The interface executive component 28 is configured to communicatively interconnect a number of components 20, 22, 24, 26 having different protocols on a selected basis to provide significant flexibility. This flexibility provides a medical imaging system 10 capable of achieving communication between a variety of different input imaging devices 12 and one or more output imaging devices 18 having a variety of different functional capabilities. Thus, interface executive component 28 treats each functionally independent component 20, 22, 24, 26 as a "black box" with a clearly identified set of responsibilities and a defined interface. The interface executive component 28 selects the appropriate series of black boxes based on the environment, and binds them together with "handles" to one another to form the complete pipeline 30. As a further advantage, interface executive component 28 preferably is configured to dynamically bind the components "on the fly" to form a communication pipeline 30 appropriate for the current imaging environment. Moreover, interface executive component is configured to produce a scalable software architecture having a plurality (1-N) of communication pipelines 30 configured according to different protocols. The scalable architecture enables output imaging device 18 to communicate simultaneously with several input imaging devices 12 on a shared basis using the necessary protocols, as provided by each pipeline 30. Alternatively, a plurality of output imaging devices 18 can be provided, each being communicatively interconnected with a particular pipeline 30.

The interface executive component 28 scales the software architecture to match the requirements of the environments, creating as many pipelines 30 as there are input imaging devices 12 requiring an interface with an output imaging device 18. The interface executive component 28 selectively binds a series of components 20, 22, 24, 26 having specific protocols necessary to match a particular input imaging device 12, a particular output imaging device 18, and the required hardware interfaces. The nature of components 20, 22, 24, 26 enables them to be selectively "swapped" in or out of a pipeline 30 in a modular fashion by interface executive component 28. Each of the components 20, 22, 24, 26 is made interchangeable with another component of like type, but different protocol, by a series of software interfaces. Specifically, each component is configured according to a particular protocol, but includes a "base-class" software interface that translates the protocol into a base-class protocol generic to every component of like type. The base-class interface is preferably built into each component such that any component 20, 22, 24, 26 in a pipeline 30 can be replaced without affecting the configuration of the other components in the pipeline. Thus, individual components 20, 22, 24, 26 also can be reused, significantly reducing costs previously associated with redesign efforts.

For example, if pipeline 30 were to be configured for communication between a Siemens input imaging device 12 and an output imaging device 18 implementing 3M SuperSet functionality, all via serial data, interface executive component 28 would communicatively bind: (1) an input driver component 20 having an input driver protocol appropriate for receiving imaging information via a serial hardware interface associated with the Siemens input imaging device, (2) an input interpreter component 22 having an input interpreter protocol appropriate for generation of first imaging requests based on the format of the image information received form the Siemens input imaging device, (2) an output interpreter component 24 having an output interpreter protocol appropriate for generation of second imaging requests understood by the 3M SuperSet output imaging device, and (4) an output driver component 26 having an output driver protocol appropriate for communication of the second imaging requests via a serial hardware interface associated with the 3M SuperSet output imaging device.

Alternatively, if the pipeline 30 described above were to be modified for communication between a Toshiba input imaging device 12 and a 3M SuperSet output imaging device 18, all via serial data, it would only be necessary to "swap" the input driver component 20 and input interpreter component 22 with components configured according to input driver and input interpreter protocols, respectively, appropriate for the Toshiba modality. The output interface component 16, which includes a 3M Superset-configured output interpreter component 24 and a 3M Superset serial-configured output driver component 26, would already be configured according to the requirements of output imaging device 18, independently of input imaging device 12, and therefore would be unaffected by the modification. Thus, interface executive component 28 would communicatively bind: (1) an input driver component 20 having an input driver protocol appropriate for receiving imaging information via a serial hardware interface associated with the Toshiba input imaging device, (2) an input interpreter component 22 having an input interpreter protocol appropriate for generation of first imaging requests based on the format of the image information received form the Toshiba input imaging device, (2) an output interpreter component 24 having an output interpreter protocol appropriate for generation of second imaging requests understood by the 3M SuperSet output imaging device, and (4) an output driver component 26 having an output driver protocol appropriate for communication of the second imaging requests via a serial hardware interface associated with the 3M SuperSet output imaging device.

As another alternative, if the pipeline 30 described above were to be modified for communication between a Toshiba input imaging device 12 and a 3M 952 output imaging device 18, all via serial data, only modification of output interface component 16 would be necessary. Specifically, interface executive component 28 would communicatively bind: (1) an input driver component 20 having an input driver protocol appropriate for receiving imaging information via a serial hardware interface associated with the Toshiba input imaging device, (2) an input interpreter component 22 having an input interpreter protocol appropriate for generation of first imaging requests based on the format of the image information received form the Toshiba input imaging device, (2) an output interpreter component 24 having an output interpreter protocol appropriate for generation of second imaging requests understood by the 3M 952 output imaging device, and (4) an output driver component 26 having an output driver protocol appropriate for communication of the second imaging requests via a serial hardware interface associated with the 3M 952 output imaging device. Thus, input interface component 14, including a general serial-configured input driver component 20 and a Toshiba-configured input interpreter component 22, would be unaffected by the modification.

Finally, if the pipeline 30 described above were to be modified for communication between a Toshiba input imaging device 12 having a serial hardware interface and a 3M 952 output imaging device 18, having a dual-port RAM interface, only modification of output interface component 16 would be necessary. Specifically, interface executive component 28 would communicatively bind: (1) an input driver component 20 having an input driver protocol appropriate for receiving imaging information via a serial hardware interface associated with the Toshiba input imaging device, (2) an input interpreter component 22 having an input interpreter protocol appropriate for generation of first imaging requests based on the format of the image information received form the Toshiba input imaging device, (2) an output interpreter component 24 having an output interpreter protocol appropriate for generation of second imaging requests understood by the 3M 952 output imaging device, and (4) an output driver component 26 having an output driver protocol appropriate for communication of the second imaging requests via a dual-port RAM hardware interface associated with the 3M 952 output imaging device. Thus, input interface component 14, including a general serial-configured input driver component 20 and a Toshiba-configured input interpreter component 22, would be unaffected by the modification.

To facilitate interchangeability, as described above, the software interfaces between components 20, 22, 24, 26 must be pre-defined to make each type of component generic. At the same time, however, an individual component 20, 22, 24, 26 must be configured to implement functions specific to a particular protocol. In accordance with the present invention, the solution lies in object-oriented techniques that are used to develop a generic base-class protocol for each type of component, e.g., input driver component 20. The generic base-class protocol specifies the functions provided by a component and the procedures for accessing such functions. Each specific protocol component "inherits" from the corresponding base class protocol, and implements the interface to conform to the environment. The term "inheritance" is used herein to refer to an object-oriented programming concept by which abstract data types can be extended to allow for type/subtype relationships. Rather than reimplementing shared characteristics, a class can inherit selected data members and member functions of other classes.

Class inheritance allows the members of one class to be used as if they were members of a second class. No additional programming is required to implement the subclass, except for those operations that either extend or replace the members inherited from the other classes. As an object-oriented system develops, subclasses are constructed out of existing classes until the appropriate functionality is developed. The construction of subclasses results in the formation of a class hierarchy. The class hierarchy is rooted by a special class, referred to as the base class. The base class contains a minimal set of behavior common to all subclasses. In accordance with the present invention, each component 20, 22, 24, 26 is configured according to a specific protocol, but also serves as a sub-class of the base class protocol. Because each component 20, 22, 24, 26 inherits from the base-class protocol and implements a minimal set of functions such that they meet base-class requirements, it can be directly interchanged with any other component of like type that inherits from the same base-class protocol. The interchangeability resulting from the object-oriented techniques produces a "direct-connect" software architecture in which each component can be effectively plugged into pipeline 30 without the need for additional interface development.

Figure 2:
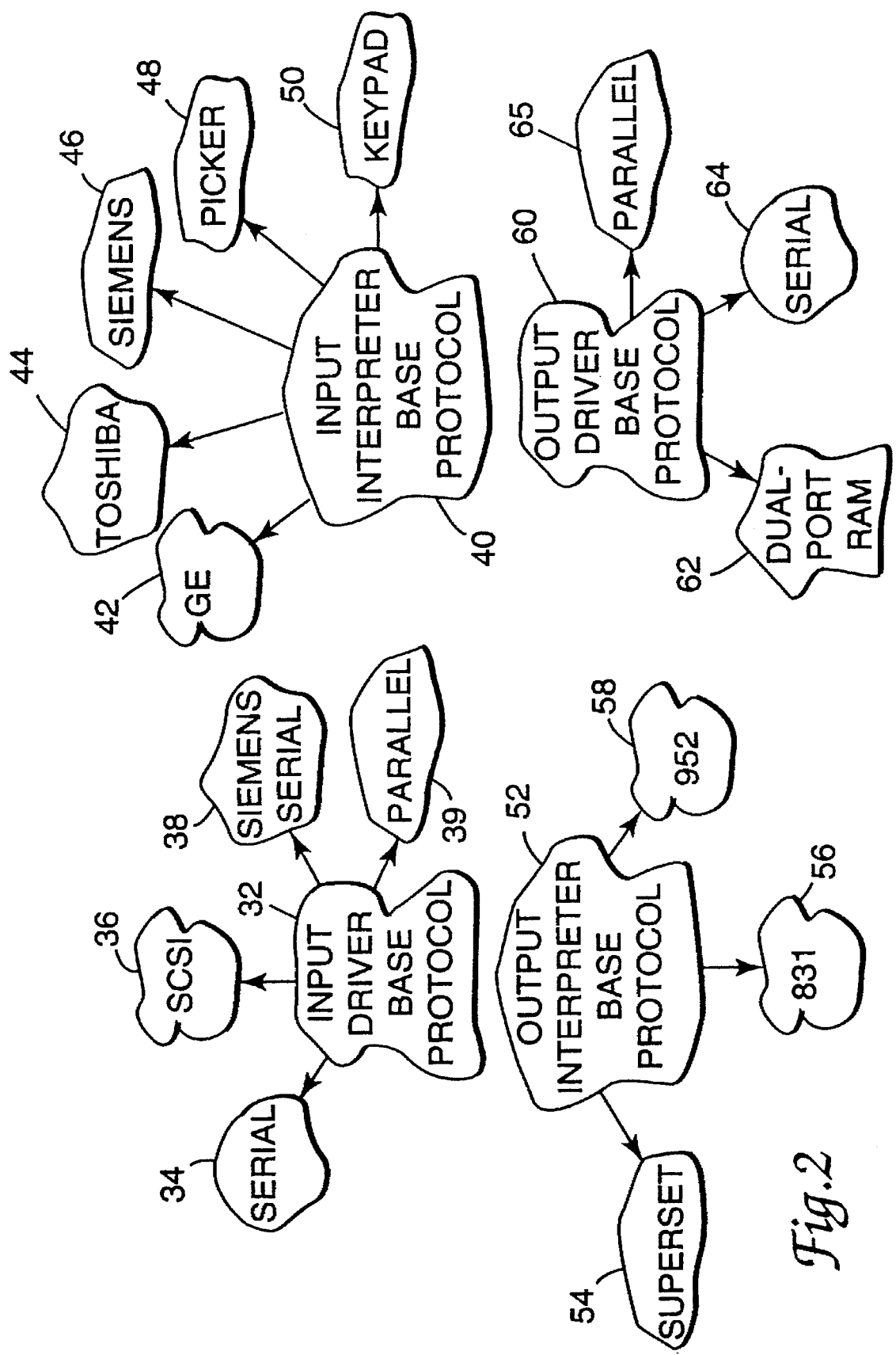
FIG. 2 is a diagram of the relationship between a plurality of diverse protocols and a set of base-class protocols, in accordance with the present invention.

FIG. 2 is an example of an object-oriented protocol hierarchy that facilitates interchangeability of components 20, 22, 24, 26. The protocol hierarchy illustrates the implementation of components 20, 22, 24, 26 for specific protocols that each "inherit" from a genetic base-class protocol. For example, an input driver base protocol 32 may encompass a plurality of "inheriting" input driver protocols for different hardware interface requirements associated with an input imaging device 12, such as a general serial input driver protocol 34, an SCSI input driver protocol 36, a Siemens serial input driver protocol 38, or a parallel input driver protocol 39. A base-class input interpreter protocol 40 may encompass a plurality of inheriting input interpreter protocols for different types of input imaging devices 12 or manufacturers, such as a GE input interpreter protocol 42, a Toshiba input interpreter protocol 44, a Siemens input interpreter protocol 46, or a Picker input interpreter protocol 48. As shown in FIG. 2, base-class input interpreter protocol 40 may also encompass inheriting protocols for user interface devices such as a keypad protocol 50.

Similarly, a base-class output interpreter protocol 52 may encompass a plurality of inheriting output interpreter protocols for different types of output imaging devices 18, such as a 3M SuperSet output interpreter protocol 54, a 3M 831 output interpreter protocol 56, or a 3M 952 output interpreter protocol 58. Finally, a base-class output driver protocol 60 may encompass a plurality of inheriting output driver protocols for different hardware interface requirements associated with output imaging device 18, such as a dual-port RAM output driver protocol 62, a serial output driver protocol 64, or a parallel output driver protocol 65. Each of the inheriting protocols described above includes protocol-specific functions provided by a component 20, 22, 24, 26, but implements such functions via a generic interface that inherits from the corresponding base-class protocol 32, 40, 52, 60. For each base-class protocol 32, 40, 52, 60, described above, a variety of additional inheriting protocols can be implemented, according to the requirements of the medical imaging system environment.

Figure 3:
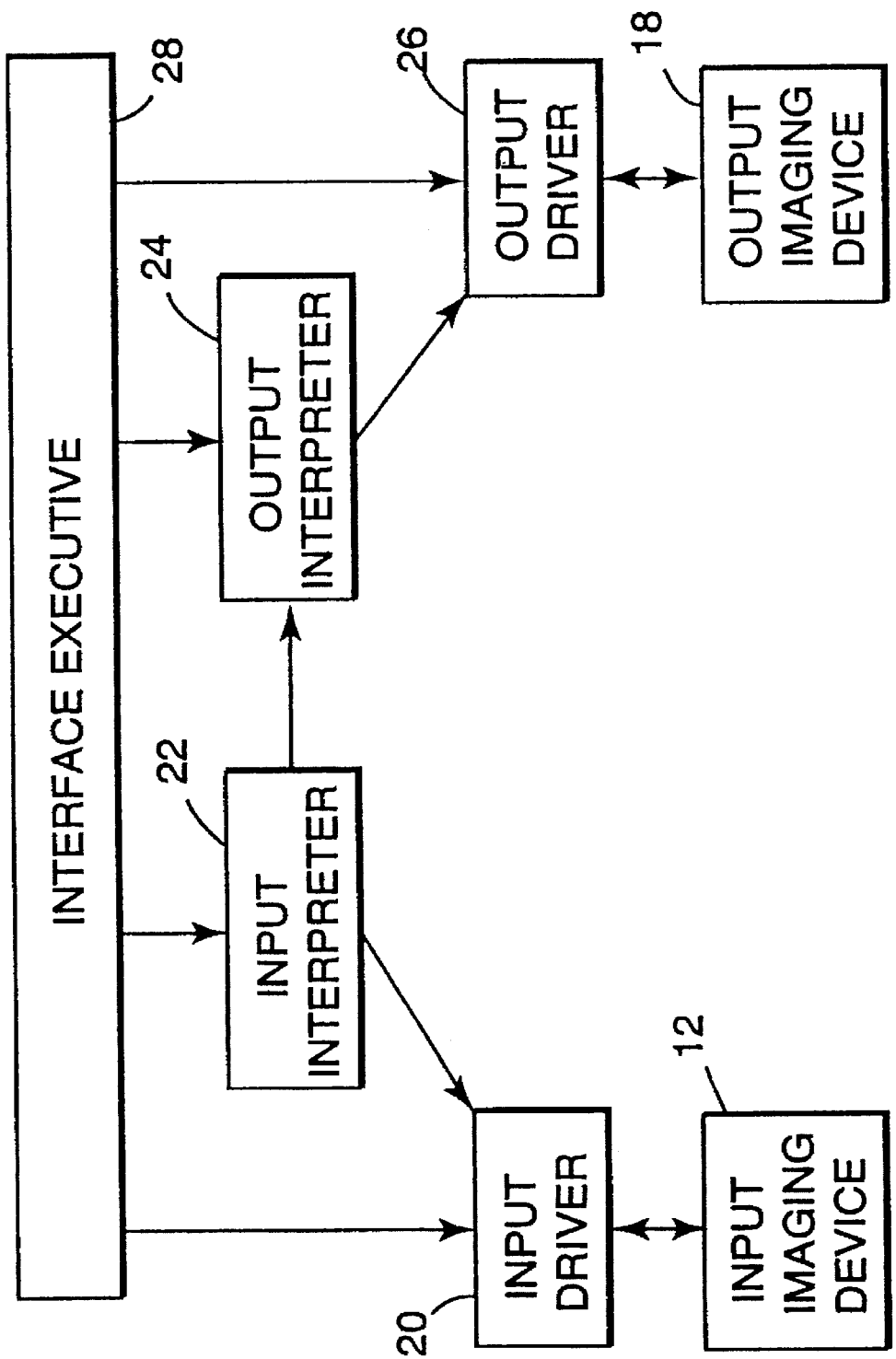
FIG. 3 is a functional block diagram of a client-server relationship applicable to the medical imaging system shown in FIG. 1, in accordance with the present invention.

As shown in FIG. 3, interface executive component 28 preferably defines pipeline 30 according to a client-server architecture. In FIG. 3, an arrow pointing from a component A to a component B indicates that component A is a client component of server component B. The bi-directional arrows between input driver component 20 and input imaging device 12 and between output driver component 26 and output imaging device 18 do not represent a client-server relationship, but rather the hardware/software interfaces of medical imaging system 10. As indicated by the arrows in FIG. 3, interface executive component 28 preferably defines the client-server relationship such that input interpreter component 22 is a client component of both input driver component 20 and output interpreter component 24, and output interpreter component 24 is a client component of output driver component 26. Consequently, input driver component 20 and output interpreter component 24 are server components for input interpreter component 22, and output driver component 26 is a server component for output interpreter component 24. The interface executive component 28, itself, is a client component of input driver component 20, input interpreter component 22, output interpreter component 24, and output driver component 26.

In the client-server relationship described above, both input driver component 20 and output driver component 26 are purely server components for input interpreter component 22 and output interpreter component 24, respectively. The input driver component 20 and output driver component 26 are responsible for low-level hardware requirements and are under control of the higher-level input interpreter component 22 and output interpreter component 24, respectively. The input interpreter component 22 is a client component of output interpreter component 24, which provides a set of functions by which the input interpreter component controls output imaging device 18. The output interpreter component 24 never initiates communication with input interpreter component 22, but rather provides services at the request of the input interpreter component. Finally, every component 20, 22, 24, 26 is a server component for interface executive component 28. Thus, interface executive component 28 ultimately controls the entire software system.

Communication between components 20, 22, 24, 26, 28 in the client-server relationship is carried out by the issuance of remote procedure calls (RPC's). A remote procedure call is a common communication mechanism often used in complex distributed software systems. A client component executes a particular function by issuing a remote procedure call to a corresponding server component. The use of remote procedure calls hides the specific details and dependencies, i.e., protocol-specific characteristics, of the individual components. The remote procedure call handles all of the mechanisms necessary for intercomponent communication. As a result, the communication mechanisms remain generic, eliminating the need for the design of protocol-specific mechanisms in each component. Each component 20, 22, 24, 26 is configured to provide services to a client component, but is unaware of which or how many components are actually using it as a server component. The components 20, 22, 24, 26 simply perform the requests of client components without exhibiting protocol-specific dependencies.

A remote procedure call is used to execute a function in the following manner. First, when a software process being performed by a client component needs to execute a particular function, the process simply calls the function by its identifier. A layer of software residing within the client component, commonly referred to as a "client stub," traps the function call. If the client stub determines that the software code necessary to perform the called function actually exists within another server component, the client stub creates a message enclosing any data passed with the function call, as well as any necessary packetizing and addressing. The client stub then sends the message to the server component via the real time operating system existing in the software system. The server module contains a layer of software code, known as the server stub, that receives the message. The server stub strips apart the message and actually calls the correct local function with any data pulled from the message. The local function executes as if it were originally called locally, returning any information requested. The server stub creates a response based on the returned information, and sends the response to the client component via the operating system. Upon receipt of the response, the client stub pulls out the returned information and passes the information to the local software process that originally called the function. The local software process then continues unaware that any inter-module communication occurred.

The following sections provide details concerning the manner in which each base-class protocol can be implemented in an exemplary embodiment of medical imaging system 10, in accordance with the present invention. In particular, sections A–D provide exemplary definitions and requirements of services provided by each of components 20, 22, 24, 26, represented for purposes of illustration in the C++ object-oriented programming language, with comments included where applicable. Where C++ code is used below to exemplify the functionality of a particular component, the label "host" may be used to refer to input imaging device 12 and the label "laser imager" or "LI" may be used to refer to output imaging device 18.

A. The Input Driver Base-Class Protocol

The input driver base-class protocol, in this exemplary embodiment, includes seven remote procedure calls that input driver component 20 is required to provide for its client components, interface executive component 28 and input interpreter component 22. With the remote procedure calls, a client component can directly interface with an external input imaging device 12 via input driver component 20. The seven remote procedure calls are described below in terms of the types of parameters handled and the functions performed.

| 1. | xmit_message | Parameters: | Type: |
|---|---|---|---|
| | | message | char * |
| | | Returns: | Type: |
| | | Driver return code | DRIVER_RC |

The above RPC passes a message to the input driver component to transmit to input imaging device 12. All communication requirements for transmission of the message to input imaging device 12 are handled by input driver component 20.

| 2. | receive_message | Parameters: | Type: |
|---|---|---|---|
| | | message | char * |
| | | Returns: | Type: |
| | | Driver return code | DRIVER_RC |

The above RPC retrieves a message from input driver component 20 that has been sent from the host. Again, all communication requirements for transmission of the message to input imaging device 12 are handled by input driver component 20.

| 3. | set_xmit_timeout | Parameters: | Type: |
|---|---|---|---|
| | | timeout | int |
| | | Returns: | Type: |
| | | Driver return code | DRIVER_RC |

The above RPC sets a timeout value that input driver component 20 uses when sending a message to input imaging device 12.

| 4. | set_async_func | Parameters: | Type: |
|---|---|---|---|
| | | client ptr | FE_CLIENT_PTR |
| | | method ptr | FE_METHOD_PTR |
| | | Returns: | Type: |
| | | Driver return code | DRIVER_RC |

The above RPC gives the input driver component 20 a handle to an asynchronous handler associated with the client component. The above RPC provides a means by which input driver component 20 informs the client component of an asynchronous event that has occurred. The only asynchronous event that will occur relative, to input driver component 20, is MSG_PENDING, which indicates that a message has been fully received by the input driver component from the input imaging device 12 and is ready for input interpreter component 22.

| 5. | set_debug_level | Parameters: | Type: |
|---|---|---|---|
| | | debug level | DEBUG_LEVEL |
| | | Returns: | Type: |
| | | Driver return code | DRIVER_RC |

The above RPC allows the client components to set the debug level of input driver component 20. The debug levels are NO_DEBUG, LOW_DEBUG, MEDIUM_DEBUG, and HIGH_DEBUG. This parameter affects the information displayed during debugging.

| 6. | start_comm | Parameters: | Type: |
|---|---|---|---|
| | | none | |
| | | Returns: | Type: |
| | | Driver return code | DRIVER_RC |

The above RPC activates communication between input driver component 20 and input imaging device 12.

| 7. | stop_comm | Parameters: | Type: |
|---|---|---|---|
| | | none | |
| | | Returns: | Type: |
| | | Driver return code | DRIVER_RC |

The above RPC disables communication between input driver component 20 and input imaging device 12.

As indicated above, each RPC returns from input driver component 20 one of three driver return codes: (1) RPC_OK, (2) PORT_BUSY, and (3) NO_MESSAGE. The driver return codes can be defined in C++ as follows:

```
//Set return types for I/O Driver interface
typedef enum {
    RPC_OK, //RPC was issued and acknowledged
    PORT_BUSY, //Transmit RPC failed, port already transmitting
    NO_MESSAGE //Receive RPC failed, no message pending
} DRIVER_RC;
```

The actual base-class protocol for input driver component 20 can be defined in C++ as follows:

```
class INPUT_INTERFACE
{
protected:
    INT32 return_code;              // RC for OS operations
    //Expect generic pipe interface from lower level hardware ports
    PORT_ID port;                   //This port ID
    DEBUG_LEVELS debug_level;       //Current debug level
    FE_CLIENT_PTR client;
    FE_CLIENT_METHOD_PTR async_event_handler;
public:
    INPUT_INTERFACE(PORT_ID newport);
    ~INPUT_INTERFACE(void);
    //RPC's that are available to clients
    //Hide hardware interface via an event driven RPC interface
    virtual DRIVER_RC xmit_message(char *message) = 0;
    virtual DRIVER_RC receive_message(char *message) =0;
    virtual DRIVER_RC set_xmit_timeout(int timeout) =0;
    virtual DRIVER_RC set_async_func(FE_CLIENT_PTR, FE_CLIENT_METHOD_PTR) =0;
    virtual DRIVER_RC start_comm(void);
    virtual DRIVER_RC stop_comm(void);
    void set_debug_levels(DEBUG_LEVELS);
};
```

B. The Input Interpreter Base-Class Protocol

The input interpreter base-class protocol, in this exemplary embodiment, includes four remote procedure calls that input interpreter component 22 is required to provide for its client component, interface executive component 28. With the remote procedure calls, interface executive component 28 can communicate with input interpreter component 22. The four remote procedure calls for input interpreter component 22 are described below in terms of the types of parameters handled and the functions performed.

| 1. | rcvConfiguration | Parameters: | Type: |
|---|---|---|---|
| | | pointer to parameters | Param_Blk |
| | | Returns: | Type: |
| | | void | n/a |

The above RPC passes a pointer to input interpreter component 22 that points to configuration parameters for the component. The parameters have been stored since the last power-down sequence of system 10. The parameters are stored in a read-only block of a memory associated with output imaging device 18. Thus, any changes made by input interpreter component 22 will not be reflected on the next power-up.

| 2. li_event_handler | Parameters: | Type: |
|---|---|---|
| | laser imager event | IO_EVENT |
| | Returns: | Type: |
| | void | n/a |

The above RPC receives asynchronous events from input driver component 20. The asynchronous events, which include the receipt of messages from an input imaging device 12, are described above with reference to input driver component 20.

| 3. io_event_handler | Parameters: | Type: |
|---|---|---|
| | io event | LI_INTERFACE_EVENT |
| | Returns: | Type: |
| | void | n/a |

The above RPC receives asynchronous events from output imaging device 18 via output interpreter component 24 and output driver component 26. The asynchronous events received from output imaging device 18 are described in more detail below with reference to output interpreter component 24.

| 4. set_debug_level | Parameters: | Type: |
|---|---|---|
| | debug level | DEBUG_LEVEL |
| | Returns: | Type: |
| | Driver return code | DRIVER_RC |

The above RPC allows the client component, interface executive component 28, to set the debug level for input interpreter component 22. The debug levels include NO_DEBUG, LOW_DEBUG, MEDIUM_DEBUG, and HIGH_DEBUG. This parameter affects the information displayed during debugging.

As noted above, input interpreter component 22 provides a mechanism for handling asynchronous events received from output imaging device 18. The events serve to inform input interpreter component 22 of a status change at output imaging device 18. Various events indicating the status of output imaging device 18 may include: (1) FP_status change which indicates a film processor associated with the output imaging device has changed its status, (2) PR_status_change which indicates imaging hardware associated with the output imaging device has changed its status, (3) IMS_status_change which indicates an image management system responsible for formatting image data within the output imaging device has changed its status, (4) JOB_status_change which indicates an imaging job has changed its status, and (5) XFR_status_change which indicates a transfer job, involving a background transfer of image data, has changed its status. The function of the above status events is to avoid the need for input interpreter component 22 to continuously poll output imaging device 18.

The actual base-class protocol for input interpreter component 22 can be defined in C++ as follows:

```
class FRONTEND_EXECUTIVE {
protected:
    INT32 return_code;                  // RC for OS operations
    int exec_id;
    Semaphore event_reply;              // async event received
    Semaphore event_free;               // async event mailbox free
    Mailbox event_mbox;                 // event mailbox
    FRONTEND_EXECUTIVE(int, LI_INTERFACE *,INPUT_INTERFACE *);
    ~FRONTEND_EXECUTIVE(void);
    LI_INTERFACE *li_handle;            //Handle to LI interface
    INPUT_INTERFACE *input_handle;      //Handle to IO interface
    DEBUG_LEVELS debug_level;           //Debug level for module
    Param_Blk parameters;               //Pointer to parameters
    LI_async_data li_async_data;        //Data from LI events
public:
    virtual void io_event_handler(IO_EVENT event)=0;//input driver ev handler
    virtual void li_event_handler(LI_INTERFACE_EVENT,LI_async_data)=0;
    virtual void rcvConfiguration(Param_Blk)=0;//receive pointer of param block
    virtual void set_debug_level(DEBUG_LEVELS level); //set to new debug level
};
```

C. The Output Interpreter Base-Class Protocol

The input interpreter component 22 interfaces with output interpreter component 24 via a set of imaging objects. The imaging objects serve as parameters for the remote procedure calls and contain all of the available information concerning the characteristics of output imaging device 18 and the imaging process. The input interpreter component 22 can use any part of the information and disregard the rest. There are six imaging object definitions including (1) a box object, (2) a format object, (3) an image object, (4) a test image object, 5) a string object, and 6) a variety of general imaging parameter objects.

A format object is used to describe an entire sheet of imaging media on which output imaging device 18 will form an image. The format object holds information relating to film type, film size, border color, border density, etc. The charactersitics of the format object can be defined in C++ as follows:

```
class FORMAT {
public:
  FORMAT(FORMAT_ID);              // Constructor
  FORMAT(void);                   // Constructor
  void init(void);                // Initialize parameters to defaults
  FORMAT_ID id;                   // Format to which this box belongs
  TABLE bkgnd_color_table;        // Background/border color media table
  TABLE bkgnd_color_mixing_table; // Background/border color mixing table
  LEVEL bw_border_level;          // B&W border level
  COLOR color_brd_level;          // Border Color levels
  LEVEL bw_density_max;           // B&W maximum density
  FILM_TYPE film_type;            // Type of film to use
  FILM_SIZE film_size;            // Size of film to use
};
```

A box is a rectangular area of the film sheet designated to hold an image. The box has many characteristics including location, size, contrast, color, etc. The box definitions are associated with a particular format. That is, several boxes are used in conjunction with a particular format. The following C++ code describes the box object and its characteristics:

```
class BOX {
public:
  BOX(BOX_ID id,FORMAT_ID id),    // Constructor
  BOX(void);                      // Constructor
  void init(void);                // Initialize parameters to defaults
  BOX_ID id;                      // Box id #
  FORMAT_ID format_id;            // Format the box
  TABLE beta_x1;                  // Horizontal axis beta pass 1
  TABLE beta_y1;                  // vertical axis beta pass 1
  TABLE beta_x2;                  // Horizontal axis beta pass 2
  TABLE beta_y2,                  // Vertical axis beta pass 2
  TABLE color_media_table;        // Color media table to use
  TABLE contrast_table;           // B&W contrast table to use
  TABLE color_contrast_table;     // Color contrast table to use
  TABLE color_mixing_table;       // Color mixing table to use
  FRAME frame;                    // Frame to use around border
  LOCATION x_location;            // Horizontal pixel location
  LOCATION y_location;            // Vertical pixel location
  Switch_mirroring;               // Turn mirroring on and off
  Switch rotation;                // Turn rotation on and off
  OUTPUT_SIZE output_size_x1;     // X output size pass 1
  OUTPUT_SIZE output_size_y1;     // Y output size pass 1
  OUTPUT_SIZE output_size_x2;     // X output size pass 2
  OUTPUT_SIZE output_size_y2;     // Y output size pass 2
  OFFSET window_x_offset;         // Window X offset from corner
  OFFSET window_y_offset;         // Window Y offset from corner
  LENGTH window_x_length;         // Horizontal length of window
  LENGTH window_y_length;         // Vertical length of window
};
```

An image is represented by image data containing digital image values. The image data is stored in an image memory associated with output imaging device 18. The image object is used to associate certain characteristics with the image. As indicated by the above code, the characteristics may include pixel length, pixel width, pixel depth, color format, etc. When printing, an image is used to fill the boxes defined for the format that is to be used. The following C++ code describes the image object and its characteristics:

```
class IMAGE {
public:
  IMAGE(void);                    // constructor
  IMAGE(IMAGE_ID id),             // constructor
  void init(void);                // Initialize parameters to defaults
  IMAGE_ID id;                    // Identification Number
  COLOR_FORMAT mode;              // color image format
  LENGTH x_length;                // horizontal image length in pixels
  LENGTH y_length;                // vertical image length in lines
  DEPTH image_depth;              // depth of image 8-12 bits
  DURATION timeout;               // acquire timeout for this image
  Switch permanent;               // image will be held for a while
};
```

A test image object is used to symbolize images used for testing purposes. The images are software generated and have different attributes than an image. The following C++ code describes the test image object and its characteristics:

```
class TEST_IMAGE {
public:
    TEST_IMAGE(void);                    // constructor
    TEST_IMAGE(IMAGE_ID id);             // constructor
    void init(void);                     // Initialize parameters to defaults
    IMAGE_ID id;                         // Identification Number
    COLOR_FORMAT mode;                   // color image format
    LENGTH x_length;                     // horizontal image length in pixels
    LENGTH y_length;                     // vertical image length in lines
    DEPTH image_depth;                   // depth of image 8-12 bits
    DURATION timeout;                    // acquire timeout for this image
    TEST_IMAGE_TYPE image_type;          // type of test pattern
    LEVEL red_density;                   // Constant density - red density;
    LEVEL green_density;                 // Constant density - green density;
    LEVEL blue_density;                  // Constant density - blue density;
};
```

A string object is used to hold ASCII text in the image memory. The string object also allows the use of parameters such as length, intensity, type, etc. The following C++ code describes the string object and its characteristics:

```
class STRING {
public:
    STRING(void);                        // constructor
    STRING(IMAGE_ID id);                 // constructor
    void init(void);                     // Initialize parameters to defaults
    STRING_ID id;                        // id of string
    TEXT_TYPE type;                      // Type of the text
    char *text;                          // string
    LEVEL bw_foregnd_intensity;          // B&W forground intensity
    LEVEL bw_backgnd_intensity;          // B&W forground intensity
    COLOR color_foregnd_intensity;       // Color foreground intensities
    COLOR color_backgnd_intensity;       // Color background intensities
    LENGTH width;                        // width of string
    LENGTH lead;                         // # of blank lines between ASCII lines
};
```

The general parameters object is used to hold all process configuration parameters. This object can be used to set the parameters in the laser imager, or to read the current settings of the parameters. Examples of some parameters are default beta tables, default color contrast, default destination, default film size and type, etc. A few parameters are read-only, and thus cannot be set, such as the amount of memory available, the current software revision, the total prints queued, etc. The following C++ code describes the general parameter object and its characteristics.

```
class PARAMETERS {
public:
    PARAMETERS(void);                    // Constructor
    void set_defaults(void);             // Initialize to defaults
    DURATION acq_timeout;                // Acquisition timeout 1..65535 seconds
    TABLE def_beta_x1;                   // Default horizontal axis beta pass 1
    TABLE def_beta_y1;                   // Default vertical axis beta pass 1
    TABLE def_beta_x2;                   // Default horizontal axis beta pass 2
    TABLE def_beta_y2;                   // Default vertical axis beta pass 2
    LEVEL def_bw_border;                 // Default B&W Border level
    COLOR def_color_border;              // Default color border level
    COLOR_FORMAT def_cformat;            // Default acquisiton image format
    TABLE def_bw_contrast;               // Default contrast table while in B&W
    TABLE def_color_contrast;            // Default contrast table while in color
    TABLE def_color_mix;                 // Default mixing table while in color
    LEVEL def_max_density;               // Default maximum density value
    DEPTH def_depth;                     // Default bits per pixel
    DESTINATION def_destination;         // Default destination for print images
    LEVEL def_bw_dmax;                   // Default B&W maximum density value.
    IMAGE_TYPE def_image_type;           // Default acceptible image type
    FILM_TYPE def_film_type;             // Default media type
    FILM_SIZE def_film_size;             // Default media size
    LENGTH def_image_xsize;              // Default width of image in pixels
    LENGTH def_image_ysize;              // Default length of image in lines
    Switch fixed_formatting;             // Switch for fixed formatting
    FIXED_FORMAT fixed_format;           // Fixed format number
    /** Read only parameters **/
```

| | |
|---|---|
| long int fixed_image_pattern; | // Image acquisition pattern |
| MEMORY memory; | // Memory status structure |
| OP_MODE op_mode; | // Operational mode |
| RELEASE revision; | // Current revision |
| SYSTEM system; | // Imaging system of the Laser Imager |
| int total_queued, | // Total prints queued in the system |
| int total_completed; | // Total prints completed in current jobs |
| int total_failed; | // Total prints failed in current jobs |
| }; | |

One of the major responsibilities of output interpreter component 24 is to relay the status of the output imaging device 18 to the client component, input interpreter component 22. The status relay process has two steps. When output interpreter component 24 notes a status change in output imaging device 18, the event handler in the client component is called directly by the output interpreter component. The event handler is passed a status event. Again, the possible status events, which were described above with reference to the input interpreter base-class protocol, include (1) the FP_status_change, (2) the PR_status_change, (3) the IMS_status_change, (4) the JOB_status_change, and (5) the XFR_status_change. The output interpreter component 24 notifies the client, input interpreter component 22, of the above status changes, so that the input interpreter component does not need to continuously poll the laser imager.

It is the responsibility of the client, input interpreter component 22, to either ignore the status change or request further information. All status information is contained within five status objects. There is status object for the film processor, the printer, the image management system, jobs, and background jobs (transfers). Each status object has a status field which can be easily checked to see if warnings or errors exist. If warnings or errors exist, further examination of the warnings structure or the error structure can be done. Again, the client can choose to use only the information it needs. The following C++ code shows the definition for each of the status objects and the structures they contain:

```
/**Film Processor Status object typedefs and class definition **/
class Film_Processor {
public:
    Film_Processor(void);          // Constructor
    void clear(void);              // clears status object
    int id;                        // Id
    int WarmingTime;               // Time till warm
    FP_Type type;                  // Film Processor Type
    FP_Status status;              // Film Processor status
    FP_Warnings warnings;          // current warnings in Film Processor
    FP_Errors errors;              // current errors in Film Processor
};
typedef enum {
    Antares_FP,                    // Antares film processor.
    LT_SE154_FP                    // LT film processor.
    No_FP,                         // No film processor connected.
    Spectrum_FP                    // Spectrum film processor.
} FP_Type;
typedef struct {
    unsigned Busy     : 1;         // Processor is in clean-up or busy with media
    unsigned NoFP     : 1;         // No film processor docked
    unsigned OpenLoop : 1;         // Not doing calibration
    unsigned Ready    : 1;         // Ready to process film
    unsigned Warming  : 1;         // Warming up
    unsigned Warnings : 1;         // Warnings exist
    unsigned Errors   : 1;         // Errors exist
} FP_Status;
typedef struct {
    unsigned CheckChem : 1;        // Chemistry is getting bad.
    unsigned Generic   : 1;        // Miscellaneous
    unsigned HiOvf     : 1;        // One or more overflow tanks is getting high
    unsigned LoChem    : 1;        // One or more chemistry tanks is getting low
} FP_Warnings;
typedef struct {
    unsigned FPDown   : 1;         // Processor is not operational
    unsigned FullOvf  : 1;         // One or more overflow tanks are full
    unsigned Generic  : 1;         // Miscellaneous
    unsigned MediaJam : 1;         // Media jammed in the film processor
```

```
          unsigned OutChem : 1;      // One or more film chemistry tanks are empty
        } FP_Errors;

/Image Managment System Status object typedefs and class definition/
 5      class Image_Mgmnt_System {
        public:
          Image_Mgmnt_System(void);   // Constructor
          void clear(void);           // clears status object
          IMS_status status;          // Image Management System status
10        IMS_errors errors;          // current errors in Image Management System
        };
        typedef struct {
          unsigned PowerUp : 1;       // First status since it has been powered up.
          unsigned Errors  : 1;       // Errors exist in the system
15      } IMS_status;
        typedef struct {
          unsigned BadConfig  : 1;    // IMS is configured improperly
          unsigned BadTblEprom : 1;   // Table EPROMS have an incorrect checksum
          unsigned IMNVRamErr  : 1;   // Non volatile ram error in an input module
20        unsigned IMSDown    : 1;    // IMS is not operational.
          unsigned OMNVRamErr1 : 1;   // Non volatile ram error in output module 1
          unsigned OMNVRamErr2 : 1;   // Non volatile ram error in output module 2
          unsigned MemBlkErr   : 1;   // 10% or more of image memory is bad
        } IMS_errors;
25
        /**      Printer Status object typedefs and class definition        **/
        class Printer {
        public:
          Printer(void);              // Constructor
30        void clear(void);           // clears status object
          int id;                     // Printer Id
          int SheetsRemaining;        // # of sheets left
          FILM_TYPE MediaType;        // Type of film loaded
          FILM_SIZE MediaSize;        // Size of film loaded
35        int ImgPixels;              // # of imageable pixels
          int ImgLines;               // # of imageable lines in media
          Quality quality;            // Current quality condition
          PR_type type;               // Printer Type
          PR_status status;           // Printer status flags
40        PR_warnings warnings;       // current warnings in Printer
          PR_errors errors;           // current errors in Printer
        };
        typedef struct {
          unsigned Warnings: 1;       // Warnings exist in the system
45        unsigned Errors  : 1;       // Errors exist in the system
        } PR_status;
        typedef enum {
```

35

```
         Draft,
         Photo
       } Quality;
       typedef enum {
5        Spectrum_PR,              // Spectrum printer.
         Antares_PR,               // Antares printer.
         LT_SE154_PR,              // LT printer.
         No_PR,                    // No printer connected
         XL_PR                     // XL (Roadrunner) printer
10     } PR_type;
       typedef struct {
         unsigned MediaLow    : 1;  // Media is low (less than 20 sheets).
         unsigned Busy        : 1;  // The printer has a transient problem.
         unsigned PrCalib     : 1;  // Printer is generating a calibration sheet.
15     } PR_warnings;
       typedef struct {
         unsigned BadCass     : 1;  // Media cassette is inoperable.
         unsigned CassErr     : 1;  // Cassette error occurred.
         unsigned CassJam     : 1;  // Media jam at cassette.
20       unsigned CoverOpen   : 1;  // One of the covers is open.
         unsigned ExpJam      : 1;  // Media jam at exposure point.
         unsigned MediaOut    : 1;  // No media in printer.
         unsigned NoCass      : 1;  // No media cassette in printer.
         unsigned PanelErr    : 1;  // Printer LCD panel in non operable
25       unsigned PrDown      : 1;  // Printer is not operational
         unsigned RecMagFull  : 1;  // The Rec Magazine is full and needs to be emptied.
         unsigned RecMagMiss  : 1;  // The Receive Magazine is not in the printer.
         unsigned ToExpJam    : 1;  // Media jam transporting to exposure point.
         unsigned ToProcJam   : 1;  // Media jam transporting to film processor.
30     } PR_errors;

/**    Job Status object typedefs and class definition          **/
       class Job {
       public:
35       Job(void);                 // Constructor
         void clear(void);          // clears status object
         int id;                    // JOB Id
         int PrintsComplete;        // # prints printed properly
         int PrintsFailed;          // # prints printed improperly
40       int PrintsQueued;          // # prints waiting to be printed
         int FilmsComplete;         // # sheets printed properly
         int FilmsFailed;           // # sheets printed improperly
         int FilmsQueued;           // # sheets waiting to be printed
         JOB_status status;         // JOB status
45       JOB_errors errors;         // current errors in JOB
       };
       typedef struct {
```

36

```
            unsigned Done    : 1;      // Job is complete
            unsigned Killed  : 1;      // Job was killed
            unsigned Stopped : 1;      // Job was stopped
            unsigned Wait    : 1;      // Print is in print queue
 5          unsigned Errors  : 1;      // Job has errors
        } JOB_status;
        typedef struct {
            unsigned Aborted     : 1;   // Abort command issued
            unsigned BadBand     : 1;   // Images not contained in a single band
10          unsigned BadMedia    : 1;   // Media not available.
            unsigned BadTable    : 1;   // Invalid table specified
            unsigned CrossPrtErr : 1;   // Illegal configuration'
            unsigned FPErr       : 1;   // Film processor has failed.
            unsigned ImgAbut     : 1;   // Images illegally abut each other
15          unsigned IMSErr      : 1;   // Images illegally abut each other
            unsigned LinePixelErr: 1;   // Too many pixels
            unsigned MaxBadCnt   : 1;   // Two identical errors
            unsigned MaxBandImg  : 1;// max images per band
            unsigned MaxHorImg   : 1;// max horizontal images
20          unsigned MinBand     : 1;   // Fewer than min lines per band
            unsigned Parity      : 1;   // Parity error within an image
            unsigned PrErr       : 1;   // Printer has failed
            unsigned RecMagErr   : 1;   // Receive Magazine missing or full.
            unsigned WrongQual   : 1;   // Quality not available
25      } JOB_errors;

/**     Transfer Job Status object typedefs and class definition     **/
        class Xfr {
        public:
30          Xfr(void);                  // Constructor
            void clear(void);           // clears status object
            int id;                     // JOB Id
            Length X_size;              // Horizontal image size (if job complete)
            Length Y_size;              // Vertical image size (if job complete)
35          XFR_status status;          // JOB status
            XFR_errors errors;          // current errors in JOB
        };
```

```
typedef int Length;
typedef struct {
    unsigned Wait   : 1;    // Job is in queue
    unsigned Done   : 1;    // Job is complete
    unsigned Killed : 1;    // Job was killed
    unsigned Errors : 1;    // Job has errors
} XFR_status;
typedef struct {
    unsigned Aborted    : 1;  // Abort command issued
    unsigned AcqErr     : 1;  // Acquisition error.
    unsigned BadDepth   : 1;  // The depth specified cannot be set.
    unsigned BadMode    : 1;  // Incorrect current mode.
    unsigned ConnectErr : 1;  // Connection error
    unsigned EibParamErr: 1;  // Bad parameter in NVRAM
    unsigned EibSrcErr  : 1;  // Bad source value in NVRAM
    unsigned EibTranErr : 1;  // Error while translating EIB parameters
    unsigned FifoErr    : 1;  // FIFO overflow
    unsigned MemBoundErr: 1;  // Outside boundary of available memory
    unsigned MemErr     : 1;  // Memory error during store
    unsigned MemFull    : 1;  // Image memory is full
    unsigned NVRamErr   : 1;  // Misc error with NVRAM
    unsigned ParityErr  : 1;  // Parity error
    unsigned ResErr     : 1;  // store to reserved memory failed
    unsigned SetUpErr   : 1;  // Configuration error
    unsigned SizeErr    : 1;  // Image size error
    unsigned TimeOut    : 1;  // System timed out during image store
} XFR_errors;
```

The output interpreter component 24, in this exemplary embodiment, provides fifteen types of remote procedure calls. With the use of the above described imaging objects and the remote procedure calls, the client can fully operate output imaging device 18. Note that all of the parameters contained in the imaging objects described above are initialized to an "unassigned value". If the parameter is not changed by the client, the output interpreter component 24 will ignore it. This feature allows the client to use only the parameters that it needs. Each of the remote procedure calls provided by output interpreter component 24 is described below. Unless otherwise indicated, the return for each of the following remote procedure calls is a Laser Imager Response Object of type LI_response, which will be further described later in this disclosure.

1. Media Print RPCs

| a. | print | Parameters: | Type: |
|---|---|---|---|
| | | copies (opt) | int |

The above RPC initiates a general print from a laser imager functioning as output imaging device 18. The above RPC is designed to be used with fixed-formatting The format is a currently selected fixed format. Copies is an optional parameter indicating the number of copies to produce. The images that have been acquired since the last print will be used for the print.

| b. | print | Parameters: | Type: |
|---|---|---|---|
| | | format | int |
| | | image list | LIST |
| | | copies (opt) | int |
| | | density (opt) | int |
| | | destination (opt) | DESTINATION |

The above RPC initiates a print from the laser imager. Format is the format ID to use. Image list indicates which images to use to fill the format. Copies is an optional parameter indicating the number of copies to produce. Density is an optional integer which is used when a density test patch is desired. The integer value corresponds to an image ID. Destination is an optional parameter that defines a destination for the output rather than the default.

| c. | print_test | Parameters: | Type: |
|---|---|---|---|
| | | format | int |
| | | image list | LIST |
| | | dens_id | IMAGE_ID |
| | | copies (opt) int | |
| | | destination (opt) | DESTINATION |

The above RPC initiates a print from the laser imager. Format is the format ID to use. Image list indicates which images to use to fill the format. Dens_id is an integer that represents the image id of a density test patch. Copies is an optional parameter indicating the number of copies to produce. Destination is an optional parameter which defines a destination for the output rather than the default.

| d. | abort | Parameters: | Type: |
|---|---|---|---|
| | | job ID | JOB_ID |

The above RPC aborts a job having the corresponding id.

| e. | abort | Parameters: | Type: |
|---|---|---|---|
| | | none | n/a |

The above RPC aborts all jobs that have been started.

2. Formatting RPCs

| a. | define | Parameters: | Type: |
|---|---|---|---|
| | | format object | FORMAT |

The above RPC defines a format with the exact parameters as found in the format object. All parameters equal to NOT_ASSIGNED are not included in the definition.

| b. | define | Parameters: | Type: |
|---|---|---|---|
| | | box object | BOX |

The above RPC defines a box with the exact parameters as found in the box object. All parameters equal to NOT_ ASSIGNED are not included in the definition.

| c. | modify | Parameters: | Type: |
|---|---|---|---|
| | | box object | BOX |

The above RPC modifies the box that matches the id specified in the box object. All parameters equal to NOT_ ASSIGNED in the box object are not modified.

| d. | modify | Parameters: | Type: |
|---|---|---|---|
| | | box object | BOX |
| | | x_shift | LENGTH |
| | | y_shift | LENGTH |

The above RPC modifies the box that matches the id specified in the box object. The location of the box is shifted by the amounts specified in x_shift and y_shift. All parameters equal to NOT_ASSIGNED in the box object are not modified.

| e. | modify | Parameters: | Type: |
|---|---|---|---|
| | | format object | FORMAT |

The above RPC modifies the format that matches the id specified in the box object. All parameters equal to NOT_ ASSIGNED in the format object are not modified.

| f | remove | Parameters: | Type: |
|---|---|---|---|
| | | none | n/a |

The above RPC deletes the last image acquired.

| g. | remove | Parameters: | Type: |
|---|---|---|---|
| | | box object | BOX |
| | | def (opt) | Bool |
| | | all (opt) | Bool |

The above RPC deletes the box with an id matching that of the received BOX object. DEF is an optional parameter that when set to TRUE causes the job to be deferred and processed in the background. If not received, DEF is set to FALSE. ALL is an optional parameter that when set to TRUE causes all defined boxes to be deleted. If not received, ALL is set to FALSE.

| h. | remove | Parameters: | Type: |
|---|---|---|---|
| | | format object | FORMAT |
| | | def (opt) | Bool |
| | | all (opt) | Bool |

The above RPC deletes the format with id matching that of the received FORMAT object. DEF is an optional parameter that when set to TRUE causes the job to be deferred and processed in the background. If not received, DEF is set to FALSE. ALL is an optional parameter that when set to TRUE causes all defined formats to be deleted. If not received, ALL is set to FALSE.

| i. | remove | Parameters: | Type: |
|---|---|---|---|
| | | image object | IMAGE |
| | | def (opt) | Bool |
| | | all (opt) | Bool |

The above RPC deletes the image with id matching that of the received IMAGE object. DEF is an optional parameter that when set to TRUE causes the job to be deferred and processed in the background. If not received, DEF is set to FALSE. ALL is an optional parameter that when set to TRUE causes all defined images to be deleted. If not received, ALL is set to FALSE.

| j. | remove_all | Parameters: | Type: |
|---|---|---|---|
| | | def (opt) | Bool |

The above RPC deletes all images, boxes, formats and tables defined in the laser imager. DEF is an optional parameter that when set to TRUE causes the job to be deferred and processed in the background. If not received, DEF is set to FALSE.

| h. | remove_fixed_images | Parameters: | Type: |
|---|---|---|---|
| | | none | n/a |

The above RPC deletes all images stored via fixed format store RPCs.

3. Image Manipulation RPCs

| a. | store | Parameters: | Type: |
|---|---|---|---|
| | | none | n/a |

This remote procedure call is strictly used with fixed formatting. This remote procedure call acquires the next image into the next available fixed image location. The locations range from 1 to N where N is the format specific.

| b. | store | Parameters: | Type: |
|---|---|---|---|
| | | id | FIXED_ID |

This remote procedure call is strictly used with fixed formatting. This remote procedure call acquires the next image into the location specified by id. The locations range from 1 to N were N is the format specific.

| c. | store | Parameters: | Type: |
|---|---|---|---|
| | | image | IMAGE |

The above RPC acquires the next image. The return information regarding image size is placed in LI_response.

| d. | store | Parameters: | Type: |
|---|---|---|---|
| | | image | TEST_IMAGE |

The above RPC acquires the next image as a test pattern. The return information regarding image size is placed in LI_response.

| e. | store | Parameters: | Type: |
|---|---|---|---|
| | | string | STRING |

The above RPC stores the text and the id in the STRING object. This allows the client component to recall the text at any time via the id. The return information regarding string size is placed in LI_response.

| f. | transfer | Parameters: | Type: |
|---|---|---|---|
| | | image | IMAGE |

The above RPC transfers the next image as a background job. The return information regarding image size is available when image transfer is complete.

| g. | reserve | Parameters: | Type: |
|---|---|---|---|
| | | image | IMAGE |

The above RPC allocates enough image memory to hold the image described by the IMAGE object.

4. Process Configuration/Status RPC

| a. | set | Parameters: | Type: |
|---|---|---|---|
| | | parameter object | PARAMETER |

The above RPC sets the imaging parameters for the laser imager. All parameters set to NOT_ASSIGNED will be left unchanged.

5. Status RPCs

| a. | show | Parameters: | Type: |
|---|---|---|---|
| | | parameter object | *PARAMETER |

The above RPC retrieves the imaging parameters for the laser imager.

| b. | show_fixed | Parameters: | Type: |
|---|---|---|---|
| | | parameter object | *PARAMETER |

The above RPC retrieves the fixed formating imaging parameters for the laser imager. All other members in the parameter object are left unchanged. All other members in the parameter object are left unchanged.

| c. | show_mem | Parameters: | Type: |
|---|---|---|---|
| | | parameter object | *PARAMETER |

The above RPC retrieves the memory conditions of the laser imager.

| d. | show | Parameters: | Type: |
|---|---|---|---|
| | | image object | *IMAGE |

The above RPC retrieves the length and width of the image with id matching the id given in the image object. All image information is placed in the image object.

| e. | show | Parameters: | Type: |
|---|---|---|---|
| | | printer object | *PRINTER |

The above RPC retrieves the status of the printer with id matching the id given in the printer object. All printer information is placed in the printer object.

| f. | show | Parameters: | Type: |
|---|---|---|---|
| | | job object | *JOB |

The above RPC retrieves the status of the job with id matching the id given in the job object. All job information is placed in the job object.

| g. | show | Parameters: | Type: |
|---|---|---|---|
| | | printer object | *XFR |

The above RPC retrieves the status of the transfer job with id matching the id given in the transfer job object. All transfer job information is placed in the transfer job object.

| h. | show_formats | Parameters: | Type: |
|---|---|---|---|
| | | string | *char |

The above RPC retrieves a string of id's of the defined formats.

| i. | show_images | Parameters: | Type: |
|---|---|---|---|
| | | string | *char |

The above RPC retrieves a string of id's of the acquired images.

| j. | show_con_tables | Parameters: | Type: |
|---|---|---|---|
| | | string | *char |

The above RPC retrieves a string of id's of the defined contrast tables.

| k. | show_con_tables | Parameters: | Type: |
|---|---|---|---|
| | | string | *char |

The above RPC retrieves a string of id's of the defined color contrast tables.

| l. | set_debug_level | Parameters: | Type: |
|---|---|---|---|
| | | debug level | DEBUG_LEVEL |
| | | Returns: | Type: |
| | | Driver return code | DRIVER_RC |

The above RPC allows the client component to set the debug level of input interpreter component 22. The debug levels are NO_DEBUG, LOW_DEBUG, MEDIUM_DEBUG, and HIGH_DEBUG. This parameter affects the information displayed during debugging.

One advantage of the interface to output interpreter component 24 is that every remote procedure call returns a similar object. This object is called, most appropriately, the laser imager response object, as indicated above. Within the laser imager response object is a plethora of information regarding the result of the remote procedure call. However, the client may chose to examine only the information relevant to its needs. The laser imager response object has three main fields. The first is a simple boolean value entitled success. The boolean value reflects whether the request associated with the remote procedure call was accomplished or whether it failed. This information may satisfy the needs of most client components. The second field, success_data, returns any values that the client component expects if the command was successful. Normally, there will not be any information for a successful command. However, one example of information returned for a successful command would be the image size that is returned after a successful store image command. The third field, errors, is used to explain why the remote procedure call failed. This field is actually a comprehensive bit field of errors that the laser imager may incur. Again, this field is only valid if success is false.

The C++ code listed below describes the laser imager response object. The class defines the response received from the laser imager after a command has been issued. If the command executed successfully, the SUCCESS flag is set to TRUE. Any data that is received upon a successful completion will be stored in Success_Data. If the command failed, the SUCCESS flag is set to FALSE. The cause of the failure is stored in the Failures structure

```
class LI_response {
    friend SS_EXECUTIVE;
    Command cmd;                        // SS command
public:
    LI_response(void);                  // constructor
    Bool success;                       // Command executed to completion
    Success_Data success_data;              // Only valid upon successful completion
    Failures errors;                    // If command failed, errors causing failure
};
typedef struct {
    unsigned AcqEff        : 1;         // Acquistion Error
    unsigned AcqLockout    : 1;         // Acquistion never attempted, not available
    unsigned BadBoxId      : 1;         // Box ID does not exists for modification
    unsigned BadDepth      : 1;         // Pixel depth error
    unsigned BadFmtId      : 1;         // Format ID does not exist
    unsigned BadPar        : 1;         // Bad Parameter
    unsigned BadCConTbl    : 1;         // Bad Color Contrast Table
    unsigned BadCMediaTbl  : 1;         // Bad Color Media Table
    unsigned BadConTbl     : 1;         // Bad Contrast Table
    unsigned BadCMixTbl    : 1;         // Bad Color Mixing Table
    unsigned BadDensTest   : 1;         // Image is not a valid density test patch
    unsigned BadDest       : 1;         // Invalid destination
    unsigned BadImgId      : 1;         // Image was not found
    unsigned BadJobId      : 1;         // Job was not found
    unsigned BadMedia      : 1;         // Media type correct
    unsigned BadMode       : 1;         // Incorrect input mode (color/b&w)
    unsigned BoxInUse      : 1          // Box is currently being used
    unsigned Busy          : 1;         // Module is already doing an image transfer
    unsigned CConInUse     : 1;         // Color Contrast table currently being used
    unsigned ConInUse      : 1;         // Contrast table is currently being used
    unsigned ConnectErr    : 1;         // Hardware connection problem
    unsigned EibParamErr   : 1;         // EIB parameter error
    unsigned EibSrcErr     : 1;         // Invalid EIB source
    unsigned EibTranErr    : 1;         // EIB transfer parameters invalid
    unsigned Empty         : 1;         // Mbox is currently empty
    unsigned FifoErr       : 1;         // FIFO overflow
    unsigned FmtFull       : 1;         // would be more than 255 boxes in a format
    unsigned FmtInUse      : 1;         // Format currently being used
    unsigned FmtOvrLap     : 1;         // The boxes in this format overlap
    unsigned FmtOffSheet   : 1;         // box in this format will not fit on media
    unsigned FmtTMCon      : 1;         // Too many contrast tablesin this format
    unsigned FmtTMCCon     : 1;         // Too many color cont tables in this format
    unsigned FmtTMCMix     : 1;         // Too many color mix tables in this format
    unsigned FmtTMCMedia   : 1;         // Too many color med. tables in this format
    unsigned FmtTMImgs     : 1;         // Too many images specified in image list
    unsigned Full          : 1;         // MBOX is full
    unsigned InModInUse    : 1;         // Input Module is currently being used
    unsigned ImgInUse      : 1;         // Image is currently being used
    unsigned ImgInvalid    : 1;         // Image has not been fully stored yet
    unsigned JobDone       : 1;         // Job has already terminated
    unsigned MagErr        : 1;         // Magnification error
    unsigned MaxFmts       : 1;         // There would be more than 255 formats
    unsigned MaxJobs       : 1;         // Would exceed max # concurrent jobs
    unsigned MemBoundErr   : 1;         // Invalid image memory address
    unsigned MemErr        : 1;         // Memory error occured during store
    unsigned MemFull       : 1;         // Image Memory is full
    unsigned MissPar       : 1;         // Missing Parameter
    unsigned MovErr        : 1;         // Move would cause box location to become neg.
    unsigned NoMem         : 1;         // Not enough memory to execute command
    unsigned NVRamErr      : 1;         // Problem with the Non-Volatile memory
    unsigned ParityErr     : 1;         // Hardware parity error
    unsigned PassErr       : 1;         // Double pass required, single pass module
    unsigned QueueFull     : 1;         // Print Queue full. No more jobs possible.
    unsigned ResErr        : 1;         // Image size did not match reserved memory
    unsigned SetUpErr      : 1;         // Request does not match system configuration
    unsigned SizeErr       : 1;         // Size in Img Header does not match image size
    unsigned StoErr        : 1;         // Video or Digital signal error during acquisition
    unsigned TimeOut       : 1;         // Image acquistion could not be completed
```

```
    unsigned TooLong    : 1;       // Message is too long to fit in the mbox
    unsigned Unkillable : 1;       // Job(s) cannont be killed
    unsigned UnknownCmd : 1;       // Unknown command issued
    unsigned WinErr     : 1;       // Window specified is incorrect size
} Failures;
```

The following structure holds data that input imaging device 18 (the laser imager) returns if the command executes correctly. Thus, this data is only valid if no errors occurred during execution.

```
typedef struct{
    ID      id;                // Place holder for a return ID
    LENGTH  x_size;            // Place holder for an Image size
    LENGTH  y_size;            // Place holder for an Image size
```

-continued
```
    LISTlist;                  // Place holder for an ID list
}Success_Data;
```

The actual base class for output interpreter component 24 can be defined in C++ as follows:

```
class LI_INTERFACE {
public:
    LI_INTERFACE(PORT_ID new_id, OUTPUT_INTERFACE *p);//constructor
    ~LI_INTERFACE(void);
    INT32 return_code;                                      // RC for OS operations
    DRIVER_RC out_driver_rc;                                // RC from output driver
    DEBUG_LEVELS debug_level;                               // Debug level for module
    Semaphore rpc_reply;                                    // RPC response complete
    Semaphore rpc_free;                                     // RPC mailbox free
    Semaphore event_reply;                                  // async event received
    Semaphore event_free;                                   // async event mailbox free
    PORT_ID exec_id;
    Mailbox rpc_mbox;                                       // RPC mailbox
    Mailbox event_mbox;                                     // event mailbox
    OUTPUT_INTERFACE *output_handle;
    FE_PTR client;                                          // client module using us
    FE_METHOD_PTR client_async_handler;                     // pointer to async handler
    virtual Bool output_ev_handler(enum IO_EVENT event) =0; //asynch event handler
    virtual void set_async_func(FE_PTR,FE_METHOD_PTR)=0;    //set ptr to FE handler
    /*** Laser Imager Client Interface ***/
    // Basic Transparent Command
    virtual LI_response send(char *);                       //send generic text
    virtual LI_response receive(char                        //receive generic text
    // Print Commands
    virtual LI_response print(int copies=1)=0;              //Fixed format print
    virtual LI_response print(FORMAT_ID id,LIST *images,
        int copies=1,DESTINATION d=Film_Processor_1)=0;
    virtual LI_response print_test(FORMAT_ID id,LIST *images,
        IMAGE_ID dens_id,int copies=1,
        DESTINATION d=Film_Processor_1)=0;
    virtual LI_response abort(JOB_ID id)=0;
    virtual LI_response abort(void)=0;                      //Abort all jobs
    // Formatting Commands
    virtual LI_response define(BOX box)=0;                  //Define a box
    virtual LI_response define(FORMAT format)=0;            //Define a format
    virtual LI_response modify(BOX box)=0;                  //Modify a box
    virtual LI_response modify(LENGTH X_SHIFT, LENGTH Y_SHIFT, BOX
        box)=0;
    virtual LI_response modify(FORMAT format)=0;            //Modify a format
    virtual LI_response remove(FIXED_ID);                   //Remove image from a position
    virtual LI_response remove(BOX box,Bool def=FALSE,Bool all=FALSE);  //Del box
    virtual LI_response remove(FORMAT format,Bool def=FALSE,Bool
        all=FALSE);
    virtual LI_response remove(IMAGE image,Bool def=FALSE,Bool all=FALSE);
    virtual LI_response remove_fixed_images(void);          //Remove all fixed images
    virtual LI_response remove_all(Bool def=FALSE);         //Delete everything
    // Manipulation Commands
    virtual LI_response reserve(IMAGE image)=0;             //Reserve memory
    virtual LI_response store(void)=0;                      //Store next image
    virtual LI_response store(FIXED_ID)=0;                  //Store image for a position
    virtual LI_response store(IMAGE image)=0;               //Store an image
    virtual LI_response store(TEST_IMAGE image)=0;          //Store a test image
    virtual LI_response store(STRING string)=0;             //Store a test image
    virtual LI_response transfer(IMAGE image)=0;            //Transfer an image
    // Mailbox Commands
    virtual LI_response clear(MAILBOX mbox)=0;              //Clear a mailbox
```

```
virtual LI_response receive(MAILBOX mbox,char *msg)=0;      //Get a msg into a mbox
virtual LI_response send(MAILBOX mbox,char *msg)=0;         //Send a message to a mbox
// Process configuration / status commands
virtual LI_response set(PARAMETERS ptr)=0;                  //set imaging parameters
virtual LI_response show_fixed(PARAMETERS *);
virtual LI_response show_mem(PARAMETERS *ptr);              //show image memory
virtual LI_response show(PARAMETERS *ptr)=0;                //show imag. params.
virtual LI_response show(IMAGE *ptr)=0;                     //show info of image
virtual LI_response show(Film_Processor *ptr)=0;            //show status of a FP
virtual LI_response show(Image_Mgmnt_System *ptr)=0;        //show IMS status
virtual LI_response show(Printer *ptr)=0;                   //show status of Printer
virtual LI_response show(Job *ptr)=0;                       //show status of a Job
virtual LI_response show(Xfr *ptr)=0;                       //show status of Xfr job
virtual LI_response show_formats(char *ptr)=0;              //string of defined frmts
virtual LI_response show_images(char *ptr)=0;               //string of defined images
virtual LI_response show_con_tables(char *ptr)=0;           //string of cont tables
virtual LI_response show_ccon_tables(char *ptr)=0;          //string of color con tbls
};
```

D. The Output Driver Base-Class Protocol

The output driver base-class protocol, in this exemplary embodiment, is virtually identical to the input driver base-class protocol. The output driver component 26 provides five remote procedure calls for output interpreter component 24. With the five remote procedure calls, output interpreter component 24 can directly interface with an output imaging device 18, such as a laser imager. Each of the five remote procedure calls is described below:

| 1. xmit_message | Parameters: | Type: |
|---|---|---|
| | message | char * |
| | Returns: | Type: |
| | Driver return code | DRIVER_RC |

The above RPC passes output driver component 24 a message to transmit to input imaging device 12 via pipeline 30. The output driver component 26 handles all requirements for communication with output imaging device 18.

| 2. receive_message | Parameters: | Type: |
|---|---|---|
| | message | char * |
| | Returns: | Type: |
| | Driver return code | DRIVER_RC |

The above RPC retrieves a message from output driver component 26 that has been sent from output imaging device 18. Again, output driver component 26 handles all requirements for communication with output imaging device.

| 3. set_xmit_timeout | Parameters: | Type: |
|---|---|---|
| | timeout | int |
| | Returns: | Type: |
| | Driver return code | DRIVER_RC |

The above RPC sets the timeout value that output driver component 26 should use when sending to the output imaging device 18.

| 4. set_async_func | Parameters: | Type: |
|---|---|---|
| | client ptr | FE_CLIENT_PTR |
| | method ptr | FE_METHOD_PTR |
| | Returns: | Type: |
| | Driver return code | DRIVER_RC |

The above RPC gives output driver component 26 a handle to the asynchronous handler of the client component, output interpreter component 24. The above RPC is used to inform the client component of asynchronous events that have occurred. The only event is MSG_PENDING which indicates a message has been fully received from output imaging device 18 and is ready for the output interpreter component 24.

| 5. set_debug_level | Parameters: | Type: |
|---|---|---|
| | debug level | DEBUG_LEVEL |
| | Returns: | Type: |
| | Driver return code | DRIVER_RC |

The above RPC allows the client component to set the debug level for output driver component. The debug levels are NO_DEBUG, LOW_DEBUG, MEDIUM_DEBUG, and HIGH_DEBUG. This parameter affects the information displayed during debugging.

As noted above, each RPC returns one of three driver return codes: (1) RPC_OK, (2) PORT_BUSY, and (3) NO_MESSAGE. The driver return codes can be defined in C++ code as follows:

```
//set return types for I/O Driver interface
typedef enum {
  RPC_OK,       //RPC was issued and acknowledged
  PORT_BUSY,    //Transmit RPC failed, port already transmitting
  NO_MESSAGE    //Receive RPC failed, no message pending
} DRIVER_RC;
```

The actual base class protocol for output driver component 26 can be defined in C++ code as follows:

```
class OUTPUT_INTERFACE
{
public:
    OUTPUT_INTERFACE(PORT_ID newport);
    ~OUTPUT_INTERFACE(void);
    virtual DRIVER_RC xmit_message(char *message) = 0;
    virtual DRIVER_RC receive_message(char *message) = 0;
    virtual DRIVER_RC set_xmit_timeout(int timeout) = 0;
    virtual DRIVER_RC set_async_func(CLIENT_PTR,
            CLIENT_METHOD_PTR) = 0; //
    PORT_ID port; //This port ID
```

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A software system for communicating image information between at least one of a plurality of different input imaging devices and at least one of a plurality of different output imaging devices, said software system comprising:

one or more input driver components, each of said input driver components being configured to receive image information from one of said input imaging devices, said image information being received according to one of a plurality of different input driver protocols, wherein each of said input driver protocols is specifically associated with one of said input imaging devices;

one or more input interpreter components, each of said input interpreter components being configured to generate first imaging requests based on the image information received by one of said input driver components, said first imaging requests being generated according to one of a plurality of different input interpreter protocols, wherein each of said input interpreter protocols is specifically associated with one of said input imaging devices;

one or more output interpreter components, each of said output interpreter components being configured to generate second imaging requests based on the first imaging requests generated by one of said input interpreter components, said second imaging requests being generated according to one of a plurality of different output interpreter protocols, wherein each of said output interpreter protocols is specifically associated with one of said output imaging devices;

one or more output driver components, each of said output driver components being configured to communicate the second imaging requests generated by one of said output interpreter components to one of said output imaging devices, said second imaging requests being communicated according to one of a plurality of different output driver protocols, wherein each of said output driver protocols is specifically associated with one of said output imaging devices; and an interface executive component for defining one or more communication pipelines, each of said pipelines communicatively interconnecting one of said input imaging devices, one of said input driver components, one of said input interpreter components, one of said output interpreter components, one of said output driver components, and one of said output imaging devices.

2. The software system of claim 1, wherein:

each of said input driver components includes a first interface for communicating the image information to one of said input interpreter components according to a first base-class protocol generic to each of said input driver components and understood by each of said input interpreter components;

each of said input interpreter components includes a second interface for communicating the first imaging requests to one of said output interpreter components according to a second base-class protocol generic to each of said input interpreter components and understood by each of said output interpreter components; and each of said output interpreter components includes a third interface for communicating the second imaging requests to one of said output driver components according to a third base-class protocol generic to each of said output interpreter components and understood by each of said output driver components.

3. The software system of claim 2, wherein each of said first base-class protocol, said second base-class protocol, and said third base-class protocol is defined according to an object-oriented hierarchy.

4. The software system of claim 2, wherein:

each of said output driver components is further configured to receive first responses to the second imaging requests from one of said output imaging devices, said first responses being received according to one of said output driver protocols;

each of said output interpreter components is further configured to generate second responses based on said first responses received by one of said output driver components, said second responses being generated according to one of said output interpreter protocols;

each of said input interpreter components is further configured to generate third responses based on said second responses generated by one of said output interpreter components, said second responses being generated according to one of said input interpreter protocols;

each of said input driver components is further configured to communicate said third responses generated by one of said input interpreter components to one of said input imaging devices, said third responses being communicated according to one of said input driver protocols; and each of said pipelines defined by said interface executive component is a bi-directional pipeline communicatively interconnecting one of said input imaging devices, one of said input driver components, one of said input interpreter components, one of said output interpreter components, one of said output driver components, and one of said output imaging devices for hi-directional communication between one of said input imaging devices and one of said output imaging devices.

5. The software system of claim 4, wherein:

each of said output driver components includes a fourth interface for communicating the first responses to one of said output interpreter components according to a fourth base-class protocol genetic to each of said output driver components and understood by each of said output interpreter components;

the third interface of each of said output interpreter components is configured to communicate the second response to one of said input interpreter components according to said third base-class protocol genetic to each of said output interpreter components and understood by each of said input interpreter components; and the second interface of each of said input interpreter components is configured to communicate the third response to one of said input driver components according to said second base-class protocol generic to each of said input interpreter components and understood by each of said input driver components.

6. The software system of claim 5, wherein at least one of said input imaging devices includes a medical imaging device and at least one of said output devices includes a laser imager.

7. The software system of claim 5, wherein said interface executive component defines each of said pipelines according to a client-server relationship such that each of said input interpreter components is a client of one of said input driver components, each of said input interpreter components is a client of one of said output interpreter components, each of said output interpreter components is a client of one of said output driver components, and said interface executive component is a client of each of said input driver components, each of said input interpreter components, each of said output interpreter components, and each of said output driver components.

8. The software system of claim 7, wherein communication between said input interpreter components, said input driver components, and said output interpreter components is carried out by remote procedure calls generated by said input interpreter components and executed by said input driver components and said output interpreter components, wherein communication between said output interpreter components and said output driver components is carried out by remote procedure calls generated by said output interpreter components and executed by said output driver components, and wherein communication between said interface executive component, said input driver components, said input interpreter components, said output interpreter components, and said output driver components is carried out by remote procedure calls generated by said interface executive component and executed by said input driver components, said input interpreter components, said output interpreter components, and said output driver components.

9. An imaging system having a software system for communicating image information between at least one of a plurality of different input imaging devices and at least one of a plurality of different output imaging devices, said imaging system comprising:

one or more input driver components, each of said input driver components being configured to receive image information from one of said input imaging devices, said image information being received according to one of a plurality of different input driver protocols, wherein each of said input driver protocols is specifically associated with one of said input imaging devices;

one or more input interpreter components, each of said input interpreter components being configured to generate first imaging requests based on the image information received by one of said input driver components, said first imaging requests being generated according to one of a plurality of different input interpreter protocols, wherein each of said input interpreter protocols is specifically associated with one of said input imaging devices;

one or more output interpreter components, each of said output interpreter components being configured to generate second imaging requests based on the first imaging requests generated by one of said input interpreter components, said second imaging requests being generated according to one of a plurality of different output interpreter protocols, wherein each of said output interpreter protocols is specifically associated with one of said output imaging devices;

one or more output driver components, each of said output driver components being configured to communicate the second imaging requests generated by one of said output interpreter components to one of said output imaging devices, said second imaging requests being communicated according to one of a plurality of different output driver protocols, wherein each of said output driver protocols is specifically associated with one of said output imaging devices; and an interface executive component for defining one or more communication pipelines, each of said pipelines communicatively interconnecting one of said input imaging devices, one of said input driver components, one of said input interpreter components, one of said output interpreter components, one of said output driver components, and one of said output imaging devices.

10. The imaging system of claim 9, wherein:

each of said input driver components includes a first interface for communicating the image information to one of said input interpreter components according to a first base-class protocol generic to each of said input driver components and understood by each of said input interpreter components;

each of said input interpreter components includes a second interface for communicating the first imaging requests to one of said output interpreter components according to a second base-class protocol generic to each of said input interpreter components and understood by each of said output interpreter components; and each of said output interpreter components includes a third interface for communicating the second imaging requests to one of said output driver components according to a third base-class protocol generic to each of said output interpreter components and understood by each of said output driver components.

11. The imaging system of claim 10, wherein each of said first base-class protocol, said second base-class protocol, and said third base-class protocol is defined according to an object-oriented hierarchy.

12. The imaging system of claim 10, wherein:

each of said output driver components is further configured to receive first responses to the second imaging requests from one of said output imaging devices, said first responses being received according to one of said output driver protocols;

each of said output interpreter components is further configured to generate second responses based on said first responses received by one of said output driver components, said second responses being generated according to one of said output interpreter protocols;

each of said input interpreter components is further configured to generate third responses based on said second responses generated by one of said output interpreter components, said second responses being generated according to one of said input interpreter protocols;

each of said input driver components is further configured to communicate said third responses generated by one of said input interpreter components to one of said input imaging devices, said third responses being communicated according to one of said input driver protocols; and each of said pipelines defined by said interface executive component is a bi-directional pipeline communicatively interconnecting one of said input imaging devices, one of said input driver components, one of said input interpreter components, one of said output interpreter components, one of said output driver components, and one of said output imaging devices for bi-directional communication between one of said input imaging devices and one of said output imaging devices.

13. The imaging system of claim 12, wherein:

each of said output driver components includes a fourth interface for communicating the first responses to one of said output interpreter components according to a fourth base-class protocol generic to each of said output driver components and understood by each of said output interpreter components;

the third interface of each of said output interpreter components is configured to communicate the second response to one of said input interpreter components according to said third base-class protocol generic to each of said output interpreter components and understood by each of said input interpreter components; and the second interface of each of said input interpreter components is configured to communicate the third response to one of said input driver components according to said second base-class protocol generic to each of said input interpreter components and understood by each of said input driver components.

14. The imaging system of claim 13, wherein at least one of said input imaging devices includes a medical imaging device and at least one of said output devices includes a laser imager.

15. The imaging system of claim 13, wherein said interface executive component defines each of said pipelines according to a client-server relationship such that each of said input interpreter components is a client of one of said input driver components, each of said input interpreter components is a client of one of said output interpreter components, each of said output interpreter components is a client of one of said output driver components, and said interface executive component is a client of each of said input driver components, each of said input interpreter components, each of said output interpreter components, and each of said output driver components.

16. The imaging system of claim 15, wherein communication between said input interpreter components, said input driver components, and said output interpreter components is carried out by remote procedure calls generated by said input interpreter components and executed by said input driver components and said output interpreter components, wherein communication between said output interpreter components and said output driver components is carried out by remote procedure calls generated by said output interpreter components and executed by said output driver components, and wherein communication between said interface executive component, said input driver components, said input interpreter components, said output interpreter components, and said output driver components is carried out by remote procedure calls generated by said interface executive component and executed by said input driver components, said input interpreter components, said output interpreter components, and said output driver components.

17. A software system for communicating image information between at least one of a plurality of different input imaging devices and at least one of a plurality of different output imaging devices, said software system comprising:

one or more input interface components, each of said input interface components being configured to receive image information from one of said input imaging devices, said image information being received according to one of a plurality of different input interface protocols, wherein each of said input interface protocols is specifically associated with one of said input imaging devices, and to generate first imaging requests based on the received image information, said first imaging requests being generated according to said one of said input interface protocols;

one or more output interface components, each of said output interface components being configured to generate second imaging requests based on the first imaging requests generated by one of said input interface components, said second imaging requests being generated according to one of a plurality of different output interface protocols, wherein each of said output interface protocols is specifically associated with one of said output imaging devices, and to communicate the second imaging requests generated by one of said output interface components to one of said output imaging devices, said second imaging requests being communicated according to said one of said output interface protocols; and an interface executive component for defining one or more communication pipelines, each of said pipelines communicatively interconnecting one of said input imaging devices, one of said input interface components, one of said output interface components, and one of said output imaging devices.

18. The software system of claim 17, wherein each of said input interface components includes a first interface for communicating the first imaging requests to one of said output interface components according to a base-class protocol generic to each of said input interface components and understood by each of said output interface components.

19. The software system of claim 18, wherein base-class protocol is defined according to an object-oriented hierarchy.

20. The software system of claim 18, wherein:

each of said output interface components is further configured to receive first responses to the second imaging requests from one of said output imaging devices, said first responses being received according to one of said output interface protocols, and to generate second responses based on said first responses, said second responses being generated according to one of said output interface protocols; and each of said input interface components is further configured to generate third responses based on said second responses generated by one of said output interface components, said third responses being generated according to one of said input interface protocols, and to communicate said third responses to one of said input imaging devices, said third responses being communicated according to one of said input interface protocols; and each of said pipelines defined by said interface executive component is a bi-directional pipeline communicatively interconnecting one of said input imaging devices, one of said input interface components, one of said output interface components, and one of said output imaging devices for bi-directional communication between one of said input imaging devices and one of said output imaging devices.

21. The software system of claim 20, wherein each of said output interface components includes a second interface for communicating the second responses to one of said input interface components according to a second base-class protocol generic to each of said output interface components and understood by each of said input interface components.

22. The software system of claim 21, wherein at least one of said input imaging devices includes a medical imaging device and at least one of said output devices includes a laser imager.

23. The software system of claim 21, wherein said interface executive component defines each of said pipelines according to a client-server relationship such that each of said input interface components is a client of one of said output interface components, and said interface executive component is a client of each of said input interface components and each of said output interface components.

24. The software system of claim 23, wherein communication between said input interface and said output interface components is carried out by remote procedure calls generated by said input interface components and executed by said output interface components, and wherein communication between said interface executive component, said input interface components, and said output interface components is carried out by remote procedure calls generated by said interface executive component and executed by said input interface components and said output interface components.

25. An imaging system having a software system for communicating image information between at least one of a plurality of different input imaging devices and at least one of a plurality of different output imaging devices, said software system comprising:

one or more input interface components, each of said input interface components being configured to receive image information from one of said input imaging devices, said image information being received according to one of a plurality of different input interface protocols, wherein each of said input interface protocols is specifically associated with one of said input imaging devices, and to generate first imaging requests based on the received image information, said first imaging requests being generated according to said one of said different input interface protocols;

one or more output interface components, each of said output interface components being configured to generate second imaging requests based on the first imaging requests generated by one of said input interface components, said second imaging requests being generated according to one of a plurality of different output interface protocols, wherein each of said output interface protocols is specifically associated with one of said output imaging devices, and to communicate the second imaging requests generated by one of said output interface components to one of said output imaging devices, said second imaging requests being communicated according to said one of said output interface protocols; and an interface executive component for defining one or more communication pipelines, each of said pipelines communicatively interconnecting one of said input imaging devices, one of said input interface components, one of said output interface components, and one of said output imaging devices.

26. The imaging system of claim 25, wherein each of said input interface components includes a first interface for communicating the first imaging requests to one of said output interface components according to a base-class protocol generic to each of said input interface components and understood by each of said output interface components.

27. The imaging system of claim 26, wherein said base-class is defined according to an object-oriented hierarchy.

28. The imaging system of claim 26, wherein:

each of said output interface components is further configured to receive first responses to the second imaging requests from one of said output imaging devices, said first responses being received according to one of said output interface protocols, and to generate second responses based on said first responses, said second responses being generated according to one of said output interface protocols; and each of said input interface components is further configured to generate third responses based on said second responses generated by one of said output interface components, said third responses being generated according to one of said input interface protocols, and to communicate said third responses to one of said input imaging devices, said third responses being communicated according to one of said input interface protocols; and each of said pipelines defined by said interface executive component is a bi-directional pipeline communicatively interconnecting one of said input imaging devices, one of said input interface components, one of said output interface components, and one of said output imaging devices for bi-directional communication between one of said input imaging devices and one of said output imaging devices.

29. The imaging system of claim 28, wherein each of said output interface components includes a second interface for communicating the second responses to one of said input interface components according to a second base-class protocol generic to each of said output interface components and understood by each of said input interface components.

30. The imaging system of claim 29, wherein at least one of said input imaging devices includes a medical imaging device and at least one of said output devices includes a laser imager.

31. The imaging system of claim 29, wherein said interface executive component defines each of said pipelines according to a client-server relationship such that each of said input interface components is a client of one of said output interface components, and said interface executive component is a client of each of said input interface components and each of said output interface components.

32. The imaging system of claim 31, wherein communication between said input interface and said output interface components is carried out by remote procedure calls generated by said input interface components and executed by said output interface components, and wherein communication between said interface executive component, said input interface components, and said output interface components is carried out by remote procedure calls generated by said interface executive component and executed by said input interface components and said output interface components.

* * * * *